US012607553B2

(12) United States Patent (10) Patent No.: US 12,607,553 B2

Buccino et al. (45) Date of Patent: Apr. 21, 2026

(54) MAGNETIC STABILIZATION METHOD AND SYSTEM IN INFRARED, VISIBLE AND ULTRAVIOLET SPECTROSCOPY

(71) Applicant: Servomex Group Limited, Crowborough (GB)

(72) Inventors: Giuseppe Buccino, Eastbourne (GB); Martin Lopez, Crowborough (GB)

(73) Assignee: Servomex Group Limited, Crowborough (GB)

( * ) Notice: Subject to any disclaimer, the term of this patent is extended or adjusted under 35 U.S.C. 154(b) by 153 days.

(21) Appl. No.: 18/541,744

(22) Filed: Dec. 15, 2023

(65) Prior Publication Data

US 2024/0210312 A1 Jun. 27, 2024

(30) Foreign Application Priority Data

Dec. 16, 2022 (GB) ...................................... 2219121
Jun. 30, 2023 (GB) ...................................... 2310010

(51) Int. Cl.
G01N 21/31 (2006.01)

(52) U.S. Cl.
CPC ....... G01N 21/31 (2013.01); G01N 2201/025 (2013.01)

(58) Field of Classification Search
CPC ........... G01N 2021/1759; G01N 21/31; G01N 2201/025; G01N 2201/06; G02B 26/008; G02B 26/04
See application file for complete search history.

(56) References Cited

U.S. PATENT DOCUMENTS

| | | | |
|---|---|---|---|
| 4,152,594 A | 5/1979 | Schunck et al. | |
| 8,561,454 B2 * | 10/2013 | Muehleisen | .............. G01J 3/18 |
| | | | 73/24.02 |
| 2021/0336702 A1 * | 10/2021 | Kurokawa | ........... H04B 10/503 |

FOREIGN PATENT DOCUMENTS

| | | |
|---|---|---|
| GB | 1 527 834 8 | 10/1978 |
| JP | 2004-085527 A | 3/2004 |

OTHER PUBLICATIONS

Great Britain Examination Report dated Jan. 31, 2023 for U.K. Application No. GB2219121.7; 6 Pages.

(Continued)

*Primary Examiner* — Hina F Ayub

(74) *Attorney, Agent, or Firm* — DALY, CROWLEY, MOFFORD & DURKEE, LLP

(57) ABSTRACT

In a spectroscopic analysis system, a broadband light source emits infra-red, visible or ultra-violet light which is transmitted through a fluid in a sample cell to a broadband detector. Changes in transmitted intensity are related to measurand in the fluid. A rotatable optical modulator or chopper, driven by an electric motor and located in the optical path, has light-transmissive optical elements, and non-transmissive regions. A non-contact magnetic field generator applies a magnetic field to the modulator or chopper to damp or brake the rotation. In an aspect, the modulator is an electrically conductive, non-ferromagnetic wheel, disc or cylinder in which eddy currents are induced. Optical elements may be apertures, filters, cuvettes, etc. A Hall effect sensor, rotary encoder, optical switch, etc. may determine angular speed or position of the modulator, and a PID controller may be used to maintain rotation speed at a setpoint by modulating an electromagnetic field generator.

36 Claims, 33 Drawing Sheets

(56) References Cited

OTHER PUBLICATIONS

Ang, et al., "PID Control System Analysis, Design, and Technology;" Proceedings of the IEEE Transactions on Control, Systems Technology, vol. 13, No. 4; Jul. 2005; 18 Pages.

Baharom et al., "Eddy Current Braking Study for Brake Disc of Aluminum, Copper and Zink;" Conference Paper from the Regional Engineering Postgraduate Conference (EPC); Jan. 2011; 6 Pages.

Da Dalt et al., "Understanding Jitter and Phase Noise: A Circuits and Systems Perspective;" Book Published by Cambridge University Press in Jan. 2018; Part 1 of 2; 184 Pages.

Da Dalt et al., "Understanding Jitter and Phase Noise: A Circuits and Systems Perspective;" Book Published by Cambridge University Press in Jan. 2018; Part 2 of 2; 81 Pages.

Gay, "Contactless Magnetic Brake for Automotive Applications;" A Dissertation in partial fulfillment of the requirements for the degree of Doctor of Philosophy at Texas A&M University; May 2005; 326 Pages.

Masud et al., "Behavioural Modeling of an Optical Chopper for Intra Cavity Absorption Spectroscopy;" Conference Paper from the 2016 International Conference on Computing, Electronic and Electrical Engineering (ICE Cube); Apr. 2016; 5 Pages.

Rodrigues et al., "Design & Fabrication of Eddy Current Braking System;" International Research Journal of Engineering and Technology (IRJET), vol. 3, Issue 4; Apr. 2016; 7 Pages.

Wiederick et al., "Magnetic Braking: Simple Theory and Experiment;" American Journal of Physics, vol. 55, No. 6; Accepted for Publication Jul. 3, 1986; First Published in Jun. 1987; 4 Pages.

* cited by examiner (a)

(b)

(a)

(b)

MAGNETIC STABILIZATION METHOD AND SYSTEM IN INFRARED, VISIBLE AND ULTRAVIOLET SPECTROSCOPY

CROSS REFERENCE TO RELATED APPLICATIONS

This patent application is entitled to claim priority from UK Patent Application No. 2310010.0 filed on Jun. 30, 2023 and UK Patent Application No. 2219121.7 filed on Dec. 16, 2022, which are incorporated herein by reference.

FIELD OF THE INVENTION

The field of invention of this patent specification is spectroscopic measurement using a rotating optical modulator such as a chopper wheel. Reference to a 'chopper wheel' in the context of this patent specification includes a rotating disc having apertures or integrated optical filters allowing modulated transmission of incident radiation but also includes other configurations containing fluid-filled cuvettes, as exemplified in the description below. Spectroscopic measurements have many different industrial applications.

BACKGROUND OF THE INVENTION

Spectroscopic measurement systems have long been used for measuring the properties of fluids. These measurements are usefully employed to determine the concentration and/or other property of at least one measurand within a gas or liquid mixture. They typically involve monitoring the changes in the light transmission and/or light absorption properties of a fluid, and relating these changes to the presence of one or more measurands. In this patent specification, the term 'light' is used interchangeably with 'electromagnetic radiation' and is intended to include infra-red, visible and ultra-violet radiation. Spectroscopic measurements are widely used in a vast array of industrial applications for monitoring concentrations and/or other properties of gases and liquids, for example, in pollution monitoring, carbon capture applications, hydrogen processing, energy production with reduced environmental impact, and hazardous environment applications.

In the fields of infrared (IR), visible and ultraviolet (UV) spectroscopy, a combination of a broad-band light source and optical filters and/or gas filled cuvette filters are generally used to expose a broad-band detector, usually in conjunction with an amplifier, to a selected range of wavelengths compatible with at least one of a measurand's absorption bands. The broad-band light source may be a light emitting diode (LED) or incandescent source, and the detector may be a pyroelectric detector, thermopile, bolometer, mercury cadmium telluride (MCT), photomultiplier detector, photo-conductive or photo-voltaic mode photodiode. It is common to use a rotating wheel or disc, often called a "chopper wheel", which allows transmission of light during part of its rotation, with at least one integrated optical element, such as an aperture, optical pass band filter or gas filled cuvette filter to provide a modulated excitation to the detector system to enhance its signal to noise performance and to improve measurement inaccuracies such as drift and ageing. Note that, in some embodiments, instead of a "thin" wheel or disc, a cylinder configuration may be used, which may incorporate at least one optical element such as fluid filled cuvettes within its housing. The axis of rotation of the wheel, disc or cylinder may be nominally parallel to the incident light, but can be tilted or perpendicular in some embodiments.

For illustration, let us consider, the spectroscopic measurement technique called Gas Filter Correlation (GFC). An example of a GFC apparatus is shown in FIG. 1. Parallel light from a broadband source 101, such as an incandescent source or broadband light emitting diode (LED), is passed through an optical element 102 and then through an optical passband filter 103, to narrow the wavelength bandwidth and cut down on ambient optical noise. The light is then passed through a rotating chopper wheel 104, which contains two sealed cuvettes. One of the cuvettes 105 contains an optically non-absorbing gas, such as nitrogen, which we will be referred to as the "measure" cuvette and the other cuvette 106 contains the gas of interest, such as, carbon monoxide, carbon dioxide, methane, nitric oxide or nitrogen dioxide, which will be referred to as the "reference" cuvette. Each cuvette consists of an identical, thin cylinder or other appropriate format, scaled at either end by a window transparent to the wavelength range of interest. The partial pressure of the gas of interest and cuvette length is chosen to have at least one absorption peak within the passband range of the optical filter that is of sufficient optical density to be within the non-linear absorption range, as defined by the Beer Lambert equation. The light exiting the cuvettes is transmitted through an optical element such as a lens or window to a sealed sample cell 107, which may contain a sample gas containing the gas of interest or a calibration gas. The sample cell is sealed at the other side by optical elements 108 such as a lenses or windows, transparent to the wavelength range of interest and there is a gas inlet 109 and a gas outlet 110. The light exiting the cell is collected by a collector 111 and measured at the detector 112, which may be a pyroelectric detector, but may also be another appropriate detector such as a bolometer, thermopile, solid state photoconductive or photovoltaic optical detector or photon multiplier device. The measurement is often in the infrared range, corresponding to absorption from molecular vibrational transitions. As the wheel rotates, the detector will see alternately the signal corresponding to transmitted light exiting from the measure cuvette and sample cell $I_m$ and light from the reference cuvette and sample cell $I_r$. The reference signal may have a gain $G_0$ applied either electronically or digitally, whose value is set at calibration with nitrogen in the sample cell so that the amplified signal $G_0 I_r$ equals $I_m$ with nitrogen in the cell. $I_r$ should always be less than $I_m$ (i.c. $G_0 > 1$), since some of light has been pre-absorbed by the gas of interest in the reference cuvette, unless the signal path for $I_m$ has been adapted relative to $I_r$ to reduce the throughput such as by alterations to the measured cuvette transmission. When the gas of interest is in the sample cell, the measured signal will be reduced by an amount related to the concentration in the sample cell, but the reference signal will be reduced by a lesser extent, since the gas of interest in the cuvette has already some absorption corresponding to the non-linear absorption region of the Beer Lambert behaviour (i.e. approaching saturation). The signal S may be defined by:

$$S = K * \left( \frac{G_o I_r - I_m}{I_r} \right) \tag{1}$$

where K is an instrumentation factor.

The measurand concentration (C) may be derived from S, such as by using polynomial equations or other appropriate means such that:

$$[C] = K_c * \left(a_1 S + a_2 S^2 + a_3 S^3 + \ldots \right) \quad (2)$$

where $K_c$ is a calibration multiplication factor and the "a" constants are linearisation parameters.

Using such a system, a very accurate measurement may be obtained with low drift and low cross interference compared to a standard, non-referenced device since, except for the cuvettes, the measure and reference paths are identical, and the same source and detector are used. The signal is divided by $I_r$ to compensate for source intensity fluctuations and/or drift. Although this is an established method, there are still potential issues which limit performance and reliability such as leaks in the measure and reference cuvettes, and reliance on moving parts which suffer from wear and tear, alignment issues and angular speed jitter. Note that a similar description may be applied for the case of using optical band pass filters, where a measure and reference optical filter are used. The measure optical filter allows light to pass through it corresponding to at least one absorption line of the measurand and the reference filter is situated in a region which is close in wavelength, but where little, if any, absorption by the measurand occurs. When the gas of interest is present in the sample cell, the signal corresponding to the measure filter will reduce, whereas the reference filter signal will remain unchanged. The use of optical band pass filters may be convenient, where few cross interferent species (absorbing within the pass band region of the measure optical filter) are present and where the superior rejection of this effect by the gas filled cuvettes is not required.

During the chopper wheel rotation, the exposure time of the detector to the filtered radiation is related to the average angular speed and the jitter. However, the exact effect of the jitter on the optical signal will depend on where in the rotation cycle the jitter occurs and whether it is random and/or systematic in nature. As a generic illustration of the concept of jitter in a rotation cycle, FIG. 2 shows an optical chopper with n number of wings and radius R. The angles of the window and wing are denoted by $\alpha$ and $\beta$ in radians respectively and $\omega$ is the angular speed in radians/second.

Assuming the angle of window and wing are constant, the following formula expresses the relationship between $\alpha$, $\beta$ and n:

$$n(\alpha + \beta) = 2\pi \quad (3)$$

Consequently, the chopper disc cuts the incoming radiation into n identical pulses, each one with a duration t:

$$\tau = \frac{\alpha}{\omega} \quad (4)$$

where, $\omega$ is the chopper disc angular speed.

The relative jitter in the duration of exposure to light caused by angular speed jitter will be given by the differential of equation 4 and by re-arrangement:

$$\frac{d\tau}{\tau} = -\frac{d\omega}{\omega} \quad (5)$$

This will also have a corresponding effect on the rotational period.

A practical implementation of a chopper wheel for spectroscopic use may be a disc with one or more apertures or integrated optical filters or gas-filled cuvettes. From the above formulae, assuming the light source emission intensity and the average rotation period are constants, it may be understood that the detector's output will be affected by any variations in duration t of the exposure of the at least one optical filter and/or gas filled cuvette filter to the emission source. Any variation of the overall rotational period during one or more chopper disc revolutions, may directly influence the detector's exposure time t and its output signal, and therefore, the spectroscopic measurement. Note that even if the overall period of the rotation is constant, there may be periods of non-uniform angular speed during the rotation, which could cause intra-rotational error, as well as inter-rotational error. In addition, variations in the non-exposed time periods can also affect the signal, for example with pyroelectric sensors, thermopile sensors and bolometers, the detector element heats up and cools down during exposure and non-exposure respectively and variations will affect the signal.

These variations of t in the light exposure duration or rotational period are commonly called period jitter [5], defined as the maximum deviation of any period t from its mean t period. The period jitter in the rotation speed control, and, in particular, excessive phase noise and span jitter will adversely affect the spectroscopic measurement noise and stability.

In general, a chopper wheel rotation period or speed is precision controlled using a PID controller. FIG. 3 shows the block diagram of a PID controller in a feedback loop, where Sp(t) is the desired process value or setpoint, and Pv(t) is the measured process value.

The PID controller [6] uses the three control terms of proportional (P), integral (I) and derivative (D) to modify the controller output in order to apply accurate and optimal control. The block diagram on FIG. 3 shows the principles of how these terms are generated and applied. The PID controller continuously calculates an error value e(t) as the difference between a desired setpoint Sp(t) and a measured process variable Pv(t):

$$e(t) = S_P(t) - P_V(t). \quad (6)$$

The controller then applies a correction based on proportional, integral, and derivative terms. The controller attempts to minimise the error over time by adjustment of a control variable Cv(t), such as the applied current to an electric motor, to a new value determined by a weighted sum of the control terms.

The overall control function is:

$$C_V(t) = K_p e(t) + K_i \int_0^t e(\tau)d\tau + K_d \frac{de(\tau)}{dt} \quad (7)$$

where $K_p$, $K_i$ and $K_d$ denote the coefficients for proportional, integral and derivative terms.

The use of the PID based algorithm does not always guarantee optimal control of the system or its control stability, for example, situations may occur where there are excessive delays or the measurement of the process value is delayed, or the control action is not applied quickly enough. The response of the controller can be described in terms of its responsiveness to an error, the degree to which the system overshoots a setpoint, and the degree of any system oscillation.

FIG. 4 shows an example of a step response of Pv(t) to step change of Sp(t) vs time for different values of PID parameters. Line 401 shows the situation where no feedback control applies ($K_p$, $K_i$ and $K_d$=0). As can be seen, the process variable overshoots with no means provided of exercising control. Line 402 shows proportional only control ($K_i$ and $K_d$=0). In this case, the overshoot is corrected, but the control does not fully converge to the set point. Line 403 shows proportional and integral terms applied ($K_d$=0). Here there is a convergence to the set point, but only after a high initial overshoot and oscillation around the set point. Line 404 shows all three corrective terms being applied and there is a reduced initial overshoot and faster, smoother convergence to the setpoint value.

The fundamental difficulty with PID control is that it is a feedback control system with constant parameters and no direct knowledge of the process, and thus overall performance is reactive and a compromise.

PID controllers, when used alone, can give poor performance and the PID loop gains must be reduced, so that the control system does not overshoot, oscillate or hunt about the control setpoint value. PIDs also have difficulties in the presence of non-linearities, may trade-off regulation versus response time, do not react to changing process behaviour—for example, the process changes after it has warmed up—and have lag in responding to large disturbances.

The issues described above have typically been addressed in the past by using:

a) A larger rotating mass or rotational inertia, for example, a heavier chopper disc or flywheel, to achieve better stability of the rotational period and, therefore, of the measurement.

b) Longer averaging filtering on the detector's output.

c) A means to provide mechanical friction.

These solutions have a number of drawbacks such as:

(a) Additional wear of the moving mechanical parts, such as bearings, due to higher mass, the effect of gravity and imbalance of the load. Since, in a typical application, it is expected that the rotating wheel needs to work continuously for many years, this is a major reliability concern.

(b) Higher power requirements for the larger rotating mass can create non-compliance in applications with explosive fluids, where the maximum energy allowed to drive the rotating mass can be only in the region of few tens of micro-Joules.

(c) Longer averaging will result in slower response times to any variations of the measurand in a fluid, with additional inaccuracies created by the filter's integration of the noise generated by the rotating wheel jitter, and this may cause safety concerns in critical processes.

(d) Adding mechanical friction or damping will create more complicated behaviour such as due to potential contamination and/or variations of performance over time due to frictional wear.

With the availability of fast digital acquisition and processing electronics, PID control is becoming easier to implement, but is still ultimately limited by the physical system that it is controlling. In practice, electric motors are typically employed to drive the chopper disc, but even here there is a choice between brushless and brushed DC (direct current), AC (alternating current) and stepper motors, all with or without gearing. However, other types of motor, such as an internal combustion engine could, in principle, be employed. Gearing adds increased complexity, cost, wear and tear and, in most cases, this is not required. Stepper motors tend to have more precision, especially at lower rotational speeds than DC motors, but tend not to have the ability to work at such high speeds as the corresponding DC motors and are, generally, less efficient. Even stepper motors may benefit from a high rotational inertia wheel at slow speeds to enhance smooth rotary motion. Brushless DC motors tend to have a smoother motion and higher torque, efficiency, and life expectancy than their brushed counterparts and so are, generally, more favoured for this application. AC motors tend to be more complex and less efficient than their DC counterparts.

High mass and/or rotational inertial loads of the wheel may inhibit start-up of the motor and cause stalling and/or may increase wear due to frictional and/or gravitational loading effects, such as on the bearings. It may also require the use of a larger and/or more expensive motor than would be desired.

The use of a bi-directional electrical drive is also possible, where the drive current direction is reversed in real time during a rotational cycle to create a braking or damping effect. However, whilst it may enhance the PID feedback control, a bi-directional motor necessitates more complexity in the drive, and potentially increased wear and decreased electrical power efficiency, compared to other options. Note that a bi-directional drive, during the braking action, could create power swings, or peaks, higher than a mono-directional drive, due to the reactive energy stored in the motor's windings that combine during the inversion of current direction. In this case, transient peaks of energy above the ignition energy of hydrogen or other combustion gases could occur. This would be an important consideration for use in potentially explosive environments and/or gas samples in case of sample leaks.

Therefore, in the light of the above factors, there is still a need to provide an enhanced feedback control system to improve the rotational stability of the chopper wheel, disc or cylinder when used for spectroscopic measurements.

SUMMARY

Apparatus and methods as described below use at least one non-contact magnetic field in the proximity of a rotating optical modulator such as a rotating chopper wheel, disc or cylinder, which magnetic field introduces an opposing magnetic braking effect against the motion of the wheel, dampening the rotational jitter of the wheel and enhancing the detector's output stability and reducing noise, while maintaining a reduced mechanical wear configuration. The at least one non-contact magnetic field may be achieved by at least one permanent magnet and/or electromagnet. The use of at least one permanent magnet is preferred, where more efficient use of electrical power is desired, however the use of at least one electromagnet either alone or in conjunction with at least one permanent magnet allows the possibility to tune or modulate the applied braking effect through adjustment of the applied current to the at least one electromagnet, although this modulation effect could also be achieved by the use of piezo elements, mechanical or other suitable means with permanent magnets to adjust the location and/or angle of the magnets from the wheel, disc or cylinder.

Various systems and methods described in this patent specification provide one or more of improved spectroscopic measurement stability, reliability and response time, using a non-contact magnetic field applied to a rotating optical modulator. This is typically a chopper wheel, disc or cylinder with optically transmissive elements and non-transmissive portions. For example, a 'chopper wheel' in the context of this patent specification includes a rotating disc having apertures or integrated optical filters allowing modulated transmission of incident radiation, but also includes other configurations containing fluid-filled cuvettes. The rotating optical modulator is used as an optical chopper and/or modulator for modulating the light passed through a fluid sample for use in spectroscopic measurement. The magnetically controlled operation of the optical modulator can enhance the performance of the measurement of the concentration or other property of a measurand within a liquid or gas mixture.

One aspect of the invention provides method for use in a spectroscopic analysis system. The system has a broad-band light source emitting light in the infrared, visible or ultraviolet range; a sample cell configured to receive the fluid to be measured; a broadband detector arranged to receive emitted light after transmission through the sample call, to detect changes in the emitted radiation after transmission through the sample cell; an analyser to analyse the change in transmitted intensity and relate this change to at least one property of a least one measurand in the fluid. Additionally, the system includes a rotatable optical modulator located in the optical path of the emitted light, to act as an optical chopper and/or modulator; and an electrically-driven motor arranged to rotate the rotatable optical modulator. The optical modulator contains, or is attached to, at least some electrically conductive material. The method comprises using the electrically-driven motor to rotate the rotatable optical modulator; and applying at least one non-contact magnetic field to the optical modulator when it is rotating, to induce electrical currents within the electrically conductive material of the optical modulator, to generate a magnetic damping force acting against the rotation of the optical modulator.

In a second aspect, the present invention provides an apparatus for use in spectroscopic measurement, comprising: a broad-band light source to emit light in the infrared, visible or ultraviolet range; a sample cell to receive the fluid to be measured; a broadband detector arranged to receive emitted light after transmission through the sample cell, to detect changes in the transmitted light after transmission through the sample cell; an analyser to analyse the change in transmitted light intensity and relate this change to at least one property of a least one measurand in the fluid; and a rotatable optical modulator located in the optical path of the emitted light, the optical modulator having at least one light transmissive optical element and at least one non-transmissive region to act as an optical chopper and/or modulator of the emitted light when rotated; and an electrically-driven motor arranged to rotate the optical modulator; wherein at least one non-contact magnetic field generator is arranged to apply a magnetic field to the optical modulator when rotating, for magnetic damping or braking of rotation of the optical modulator.

In an example apparatus, the rotatable optical modulator is a chopper wheel such as a rotatable disc or cylinder and the light transmissive optical element(s) of the wheel are apertures, windows, lenses, or integrated fluid-filled cuvettes or optical pass band filters for transmission of a particular range of wavelengths. In another example, the optical modulator is a rotatable cylindrical body housing one or more fluid-containing cuvettes in optical alignment with a light transmissive region.

In an example apparatus, the wheel disc or cylinder contains at least some electrically conductive material, and preferably non-ferromagnetic material.

In an example apparatus, an electric motor or other means is provided to rotate the wheel, disc or cylinder, and a sensor and control circuitry provide feedback of the position and/or motion of the wheel, disc or cylinder and the control circuitry provides feedback control of the magnetic field generator to stabilise or otherwise modulate the rotational speed (angular velocity) of the wheel, disc or cylinder. In an example apparatus, the magnetic damping or braking force is generated by electrical currents induced within the electrically conductive material of the wheel, disc or cylinder, to generate a damping or braking force parallel to the direction of rotation of the wheel, disc or cylinder. This feedback control of the rotational speed of the wheel, disc or cylinder provides a more stable motion compared to an identical system without the presence of the magnetic braking being applied to the wheel, disc or cylinder.

The broadband light source may emit in the infrared, visible and/or ultraviolet (UV) range, approximately in the range 0.1 to 1,000 μm and at least two optical filters and/or gas filled cuvette filters may be used to expose a broad-band detector to a selected range of wavelengths compatible with at least one of a measurand's absorption bands. The broadband light source may be a light emitting diode (LED), or incandescent source and the detector may be a pyroelectric detector, thermopile, bolometer, mercury cadmium telluride (MCT), photomultiplier detector, photo-conductive or photo-voltaic mode photodiode. It is known to use a rotating wheel, often called a "chopper wheel" with mounted optical filters and/or gas filled cuvette filters to provide a modulated excitation to the detector system, to enhance its signal to noise performance and to improve measurement inaccuracies such as drift and ageing. In some embodiments, this chopper wheel is a thin disc and in other examples it may be a thicker cylinder instead. The choice of configuration of the rotatable optical modulator can be based on practical geometry considerations and/or optomechanical considerations, such as the incorporation of features within the cylinder.

The wheel, disc or cylinder, acting as an optical chopper or modulator, contains at least one optical element, which may be one or more of an aperture, a window, a mirror, a lens, an optical band pass filter or gas filled cuvette. The selection of the at least one optical element will depend on the chosen spectroscopic application and measurement. The choice may, for example, be for a modulated single optical pass band measurement requiring at least one of an aperture, a window, a mirror, a lens or an optical pass band filter. For a referenced measurement, such as optical filter or gas filter correlation measurement, the apparatus may require at least two optical pass band filters or at least two gas filled cuvettes respectively.

The wheel, disc or cylinder may be composed of any electrically conductive (high charge carrier (electron) density) material or composite. Ferromagnetic materials would normally be inadvisable, since the primary desired interaction with the applied magnetic field is via the generation of eddy currents within the material rather than via magnetic attraction (the effect of unbalanced magnetic attraction is undesirable but could be mitigated somewhat by symmetrical application of damping magnetic fields). Optimally, for smooth, long-term, low wear, operation, this wheel, disc or cylinder should be mechanically (gravitationally) balanced around the axis of rotation. This disc could be formed of a metal or metallic alloy, but the choice of material or combination of materials will be determined by the required properties for the application. Metals/metallic alloys have free charge carriers (electrons) that will be moving within the presence of the magnetic field and hence will be subject to the Lorentz force, creating eddy currents within the material. However, there are several factors to consider when selecting the optimum material for the wheel, disc or cylinder, including:

a) Charge carrier density
b) Electrical resistivity
c) Density
d) Strength
e) Heat conductivity
f) Heat capacity
g) Thermal expansion coefficient The design and material used should be appropriate to the task and, for example, a thin wheel or disc of a large diameter may require more mechanical strength than a small diameter wheel, whilst a large diameter wheel, disc or cylinder may also have a large rotational inertia for a high density material, which may be undesirable, since this will require large start up power and have higher mechanical wear.

In some embodiments there may be a non-uniform cross-sectional area of the wheel, disc or cylinder, for example, with a thinner outer diameter to minimise the rotational inertia, since this is proportional to the mass and, for any mass, proportional to the square of the distance from the centre of rotation. The radial section of the wheel, disc or cylinder exposed to the magnetic field should ideally be of uniform cross section and composition for a uniform damping or braking effect during a complete rotation, where a uniform rotational speed is desired. There may be features in the wheel, disc or cylinder to minimise the mass including thinning out or cut-through holes and the use of composite materials of lower density to decrease the rotational inertia, whilst retaining the required magnetic damping or braking effect. In some embodiments, the wheel, disc or cylinder may be partially composed of at least one other material, including a non-electrically conductive material (electrical insulator), with an electrically conductive material attached to it. Depending on the materials, attachment methods (including adhesion and mechanical fixation) and working temperature used, materials can be selected with consideration of their respective thermal expansion coefficients.

There may also be features in the wheel, disc or cylinder to enhance monitoring and/or control of the rotary motion such as magnets and/or optical reflective, absorptive and/or transmissive features, such as mirrors, black surfaces, or partial and/or complete through-cuts. These could be combined with appropriate sensing elements including magnetic field and/or optical sensing elements within the housing to confirm positional and temporal information, which is used to monitor and control the rotary motion.

In some embodiments, features within the wheel, disc or cylinder may be added to modify the magnetic braking effect. These features could include modulations in the wheel, disc or cylinder material, shape, profile or cross section, including partial or full through-cuts in the material to modify the passage of eddy currents. These could be used to regularly modulate the rotary motion within a cycle, for example, to relatively decrease the dark time and increase the exposure time of the detector to light.

In some embodiments, physical features may be added to the wheel to create an additional braking effect and/or thermal dissipation effect. For example, a chopper wheel may have radial projections that extend into a fluid surrounding the wheel, disc or cylinder, to cause viscous drag in the surrounding fluid, acting against the rotary motion. Such a "paddle wheel" effect can achieve damping via the viscous drag from the surrounding fluid and/or can create turbulence to enhance the thermal interchange with the environment from the paddle fins and/or other heat sink features of the wheel, disc or cylinder. The viscous drag and thermal dissipation from such features would also increase with increasing rotational velocity. In some embodiments, the fluid within the housing may be chosen to be a fluid with high viscosity and/or higher thermal dissipation properties. In this case, the fluid should be transparent to the wavelength range of interest.

Close temperature control of the rotating wheel, disc or cylinder is normally advised for optimal dimensional stability (ideally the material would also have a low thermal expansion coefficient) and also for constancy of optical properties of any optical element used. The absorption characteristics of reference gas filled cuvettes are temperature dependent, as are the transmission characteristics for optical band pass filters. In some embodiments, having a wheel, disc or cylinder made with low thermal mass (low heat capacity) and high thermal conductivity may be advantageous, for uniformity of temperature and fast thermal interchange with the surrounding environment. A relatively high thermal conductivity for metals and metallic alloys is to be expected, since the primary heat transmission mechanism is via the movement of electrons within the material. However, there may be instances, for example within a composite structure, where a thermal insulator may be preferred, where the optical elements are held somewhat isolated from heat generated by the movement of the eddy currents within the electrically conductive segment(s).

Although a means for temperature control will normally be provided by the housing of the wheel, disc or cylinder, Joule heating will be generated within the wheel, disc or cylinder due to the movement of the eddy current electrons induced by the magnetic field. The net drag force generated by the induced eddy currents will decrease the kinetic energy of the rotating wheel, disc or cylinder thereby braking or slowing down its motion and, in the case of an actively driven system, more power would have to be applied to the motor to maintain the same rotational speed compared to an apparatus with no magnetic field present, in order to compensate for this braking. However, since a controlled environmental temperature is normally maintained by active heating of the housing, this Joule heating effect (and potentially any extra heat generated in the motor) can be dissipated within the housing to reduce the power needed to heat the housing. Enhanced heat dissipation from the wheel, disc or cylinder, if required, may be achieved by adding features such as blackened surfaces to increase radiative losses from the surfaces and/or heat sink surfaces to increase the surface area for conductive, convective and radiative losses and/or other viscous drag features mentioned earlier, such as paddles. In any case, if a stable housing temperature is maintained and the wheel, disc or cylinder is being maintained with a regular motion, thermal equilibrium should be maintained. The temperature of the wheel, disc or cylinder may be determined by suitable means including non-contact methods, such as through black or grey body radiative means and could be used for temperature monitoring and/or active control via varying the housing temperature and/or magnetic field strength and/or rotational speed.

In addition to the above considerations, ideally, the inclusion of any extra features should still be compensated for in the mechanical (gravitational) balance of the wheel, disc or cylinder either through symmetry or mechanically compensatory features including mass additions, thinning, slots or other features.

Many suitable metals or metallic alloys are paramagnetic, such as aluminium. However, others like copper are diamagnetic. Aluminium is suitable for many applications, since it has high charge carrier density, low density, low heat capacity, high thermal conductivity, reasonable mechanical strength, and is easily machinable and available at low cost. However, that does not preclude the use of other suitable materials and the chopper wheel or other optical modulator of the described apparatus is not limited to any particular material [7]. Other materials used in combination with an electrical conductor could include ceramics, including low thermal conductivity ceramics such as zirconia or high thermal conductivity ceramics such as alumina or aluminium nitride or suitable polymers.

The at least one magnet may be a permanent magnet, electromagnet or combination of both. The magnetic field may be applied to just one side or edge of the wheel, disc or cylinder or may be applied through the wheel, disc or cylinder by the use of magnetic poles of opposite polarity. Electromagnets may be tuned or modulated by the magnitude and/or direction of the current applied. Electromagnets may be run in DC mode, AC mode or in combination. Electromagnets are generally larger and more expensive to create the same field strength compared to a strong permanent magnet, such as one made with neodymium. In addition, they require electrical power and generate heat, which may be difficult to dissipate. The field provided by the at least one permanent magnet and/or electromagnet may be tuned by the magnetic field strength of the magnet and/or angle and/or distance away from the wheel, disc or cylinder and/or perpendicular distance of the magnet from the axis of rotation. The shape (including edge effects), extent and strength of the magnetic field are important factors in eddy current generation and may also be modified by the use of pole pieces made of ferromagnetic material (high magnetic permeability). If using pole pieces with an electromagnet in DC rather than AC mode, regular de-gaussing of the pole pieces may be required. The radial distance of the at least one magnet from the rotational centre (axis) is also important. It has been stated earlier that, for a fixed magnetic field strength/embodiment, the magnet braking effect will increase with increasing rotational speed. However, there are other factors to consider. Local to the magnetic field, the relative tangential velocity (v) of the wheel, disc or cylinder is:

$$v = r\omega \qquad (8)$$

where r is the perpendicular distance away from the rotational axis and $\omega$ is the angular velocity.

Equation 8 shows that the tangential velocity is not only directly proportional to the angular velocity ($\omega$), but also to the perpendicular distance (r) away from the rotational axis. This means that the same magnet would exhibit a greater braking effect, when situated closer to the outside of the wheel, disc or cylinder, compared to being closer to the axis of rotation. Also, a smaller and/or weaker magnet at the outside of the wheel, disc or cylinder could be used to obtain the same effect as a stronger magnet closer to the axis of rotation. In a similar way, the magnetically induced braking torque around the axis of rotation will also be greater for a magnet situated towards the outside of the rotating wheel, disc or cylinder.

Since the magnetic braking effect will increase with the angular velocity of the wheel, disc or cylinder of the rotating optical modulator, this angular velocity can be chosen and/or adjusted to create the required magnetic braking effect for a given magnetic configuration.

In some preferred embodiments, rather than using a single magnet, an arrangement of two or more magnets may be desired for increased drag/braking effect and/or to create a symmetrical drag around the rotational axis—this may enhance a smooth rotary motion and/or increase the life expectancy of the bearings/motor. In practice, a combination of factors will be used to decide the preferred magnetic field strength(s), location(s) and angular speed(s) required for any individual application, taking into account such factors as the response times of the detectors and electronics, the physical sizes of the optical modulator and components and the response time and signal to noise required.

Typically, an electrically driven motor will be used to rotate the wheel, disc or cylinder and this may be a brushless or brushed DC motor, AC motor or stepper motor. Such motors can be provided with or without gearing between the electric motor and the driven wheel, disc or cylinder, and can be provided with or without a rigid or flexible coupling means.

Any suitable means can be used for determining the rotational speed and/or position of the wheel, disc or cylinder. For example, this may include at least one of a Hall effect sensor, rotary encoder and/or optical means, such as by a reflective or slotted optical switch. A control system is used to control the wheel, disc or cylinder rotation at the desired set point speed and this may typically include PID control, as described above, which controls the electrical drive to the motor. However, other appropriate systems could be used, applicable to a control loop of any type or topology like PID, P, PI, self-calibrating PID, fuzzy logic, genetic algorithms and artificial intelligence (AI) control systems. The control system is normally supplied by an analogue or digital electronics circuit or combination and can be tuned for the application. PID or other suitable control settings may be modified in an analogue circuit by changing electronic components or, in a digital circuit, by changing software parameters.

This method is applicable to a wide wavelength range of spectroscopic measurements, including infrared, near infrared, visible and ultraviolet—i.e. approximately between 0.1 to 1,000 μm.

Since magnetic braking (damping) is being applied to the system, several advantages are present compared to the identical system with no magnetic braking applied:

a) A lighter wheel, disc or cylinder may be used, since there is not the requirement for the "flywheel" effect—this means that there will be less inertia for start-up and reduced mechanical wear on the bearings.

b) Since the magnetic braking effect is proportional to the rotational speed, there will be no braking at start up and then a gradual incrementation, facilitating a faster and/or lower-power ramp up to working speed.

c) The addition of the magnetic braking reduces overshoot in rotational speed, since the system pull back is not limited to the effects of inertial mass and internal friction.

d) The system will have a reduced "dead band" in the control loop, where no positive control is being applied. This is because the motor drive can be used against the braking force.

e) The strength of the braking force can be tuned by the strength of the at least one magnet and/or the angle and/or the location relative to the wheel, disc or cylinder (e.g. the distance away from the wheel and/or perpendicular distance from the axis of rotation).

f) Greater stability of the rotational speed will be obtained, resulting in lower jitter and hence lower noise on the signal.

g) The lower noise obtained on the signal means that the response time to sample changes is also enhanced, since less averaging is needed to obtain the same signal to noise level.

In summary, the present invention describes the use of a non-contact, magnetic damping force, independent of gravity, which has a positive impact on mechanical wear, the period jitter, the noise and response time for measurand variations.

The damping force is generated using a magnetic field applied to the wheel, disc or cylinder; with the wheel, disc or cylinder, generally of non-ferromagnetic material, having appropriate electrical conductivity and the rotational speed being such that it can create sufficient damping or braking to minimise rotational speed jitters.

A suitable eddy-current damper [3] [1] or brake consists of a stationary source of magnetic flux situated approximately perpendicular to the axis of a moving conductor. Because of the motion, the conductor experiences a time-varying magnetic flux density, which by virtue of Lenz's law results in an electric field:

$$\nabla \times \vec{E} = -\frac{\partial \vec{B}}{\partial t} \tag{9}$$

where B is the magnetic field strength at the conductor location.

This electric field creates circulating currents in the conductor by virtue of the Ohm's law:

$$\vec{J} = \sigma \cdot \vec{E} \tag{10}$$

where s is the electrical conductivity.

These currents are called "eddy-currents". The interaction of eddy-currents with the magnetic flux density results in a force that opposes the motion of the conductor, the Lorentz force:

$$\vec{F} = \vec{J} \times \vec{B} \tag{11}$$

FIG. 5 illustrates the fundamental physics of eddy-current braking applied to a disc [3].

Note that, from equation (11), in the case of a wheel, disc or cylinder rotating perpendicular to a magnetic field, the Lorentz force exhibits itself as a maximal drag force acting in the plane of rotation of the wheel, disc or cylinder. This is the reason that some preferred embodiments have this arrangement of magnetic field orientation relative to the rotating wheel, disc or cylinder. This force is proportional to the angular velocity @ [3], the electrical conductivity of the wheel, disc or cylinder material and the strength of the magnetic field at the wheel, disc or cylinder location. In practice, this field strength depends on the size and the relative placement distance of the at least one magnet from the wheel, disc or cylinder. Since the force is proportional to the angular velocity, this force is zero when the rotating wheel, disc or cylinder is stationary. Unlike a mechanical friction solution, this minimises the energy necessary to initiate the wheel, disc or cylinder rotation, which is an important consideration in applications with strict limits on motor drive electrical energy, such as in explosive environments. In addition, mechanical friction has the disadvantage of abrasion over time, which may result in changes in performance and increased maintenance requirements.

BRIEF DESCRIPTION OF DRAWINGS

Example methods and apparatus are described below, by way of example only, with reference to the accompanying drawings in which.

DETAILED DESCRIPTION & EXPERIMENTAL RESULTS

Details of some example methods, apparatus and spectroscopy systems will now be described to help illustrate the function and implementation of some of the features mentioned above. Initially, we describe the enhanced stability of rotation of a rotatable optical modulator such as a chopper wheel, disc or cylinder, achieved by the addition of at least one magnetic field and other optional features, and this is followed by a description of some exemplary system implementations and then by some experimental results.

In the following illustrations, the magnets could be permanent magnets, electromagnets or combinations and could include pole pieces, where the benefits of field shaping and/or concentrating the magnetic field are desired. Although the shape of the magnets has been shown as cylindrical for convenience, they could be of cuboid format, horseshoe or other arbitrary format depending on availability, suitability and cost. Likewise, although the optical modulators have been shown as having circular symmetry (i.e. thin discs or cylinders), they could also have a square, rectangular or other suitable format.

Figure 6:
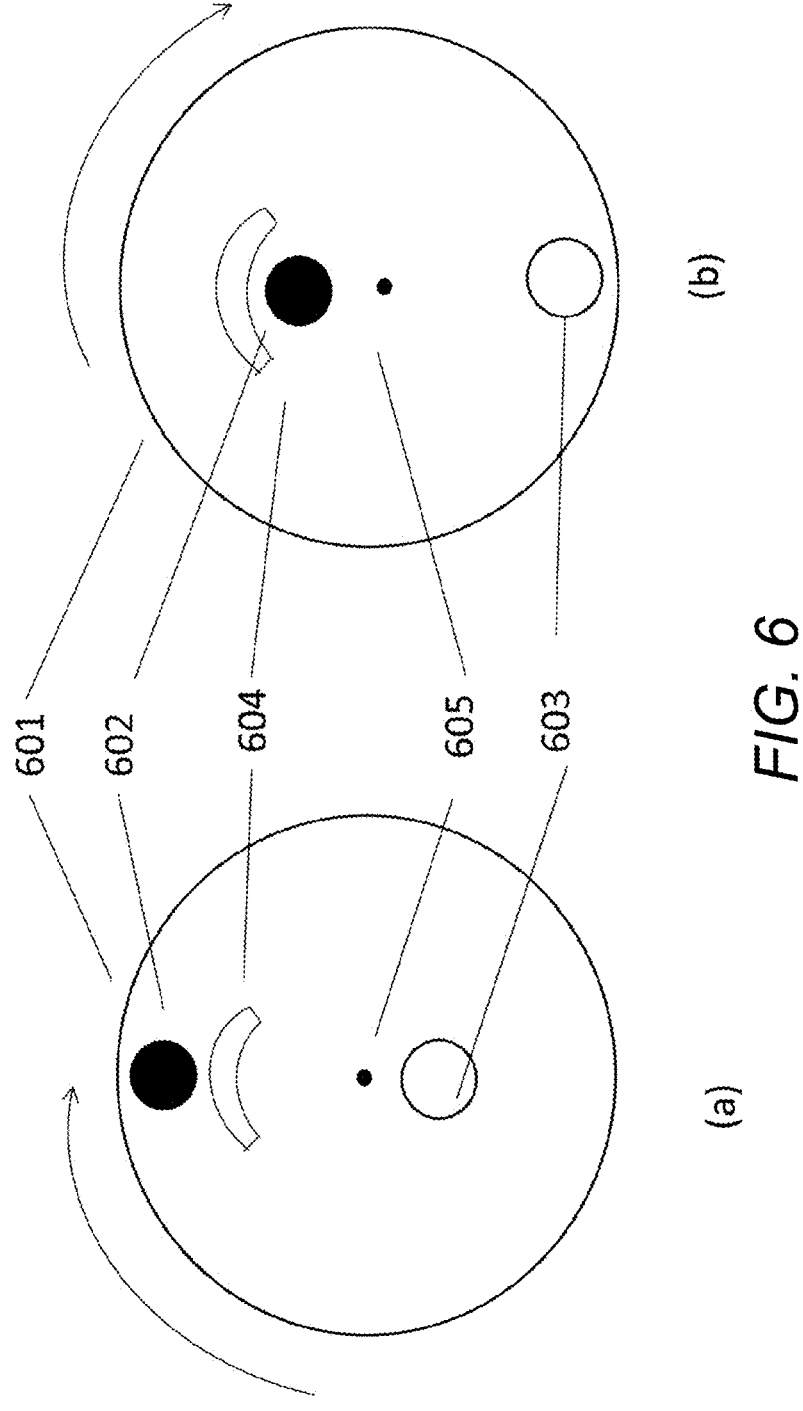
FIGS. 6(a) and 6(b) provide an illustration of two alternative configurations of rotatable discs which each have a magnet and an integral optical element.

FIGS. 6 (a) and 6 (b) show two configurations of a rotating wheel, disc or cylinder (601) with a magnet (602). The direction of motion is indicated by the curved arrow, but this could be either clockwise or anti-clockwise. The optical element (603) could be an aperture, window, lens, optical pass band filter, gas filled cuvette or other suitable component. A balancing compensatory feature (604) is optimally included to account for the displacement of the centre of mass (centre of gravity) from the centre of rotation (605) for the wheel, disc or cylinder, which could otherwise be caused by the asymmetry of the addition of the optical element (603). If the optical element (603) results in a net loss in mass compared to a solid wheel, disc or cylinder, then this compensatory element (604) may be a partial or full cut-through feature to return the mass balance symmetry, such that the wheel, disc or cylinder retains centre of mass symmetry through the axis of rotation. In this case, this feature (604) may be symmetrically located on the same diameter, but on the opposite side of the wheel, disc or cylinder or a corresponding addition in mass may be added on the same side of the wheel, disc or cylinder, such that the wheel, disc or cylinder retains centre of mass symmetry through the axis of rotation. If the optical element (603) results in a net addition of mass compared to a solid wheel, disc or cylinder, then this compensatory element (604) may be an additional mass, symmetrically located on the same diameter, but on the opposite side of the wheel, disc or cylinder or a corresponding reduction in mass on the same side of the wheel, disc or cylinder, such that the wheel, disc or cylinder retains centre of mass symmetry through the axis of rotation. Additional fine tuning of the balance of the wheel, disc or cylinder to coincide with the centre of rotation for any embodiment can be achieved by the addition of a compensatory balancing mass (such as with adhesive metallic tape), or taking away mass by laser ablation, cutting, milling, drilling or other suitable means.

Figure 7:
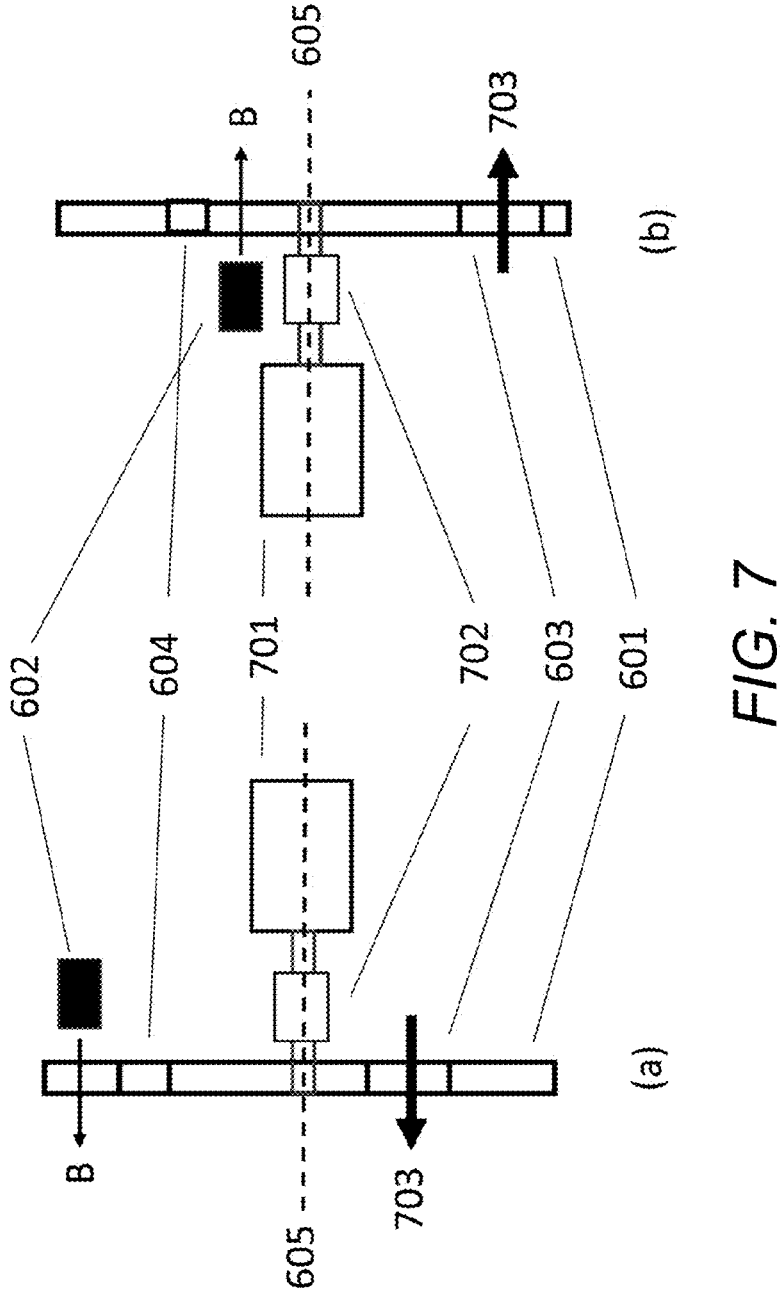
FIGS. 7(a) and 7(b) show respective cross-sectional views of the apparatus of FIGS. 6(a) and (b).

FIGS. 7 (a) and 7 (b) show cross sectional views of the embodiments from FIG. 6. In addition to those previously mentioned features are the motor (701), the geared/direct drive, flexible/rigid coupling means (702) of the motor to the wheel, disc or cylinder. The figure also includes an illustration of the magnetic field "B", which could be in either direction, and the beam of light from the source (703), which could also be in either direction, depending on the design of the spectrometer. If a flexible coupling is used to connect the motor drive to the wheel, disc or cylinder, the wheel, disc or cylinder may need a separate bearing pair to allow stable rotary motion of the wheel, disc or cylinder. The coupling means (702) may include adhesive means, mechanical coupling means, such as bolts and/or screws, and contact/off-contact magnetic coupling means.

Figure 8:
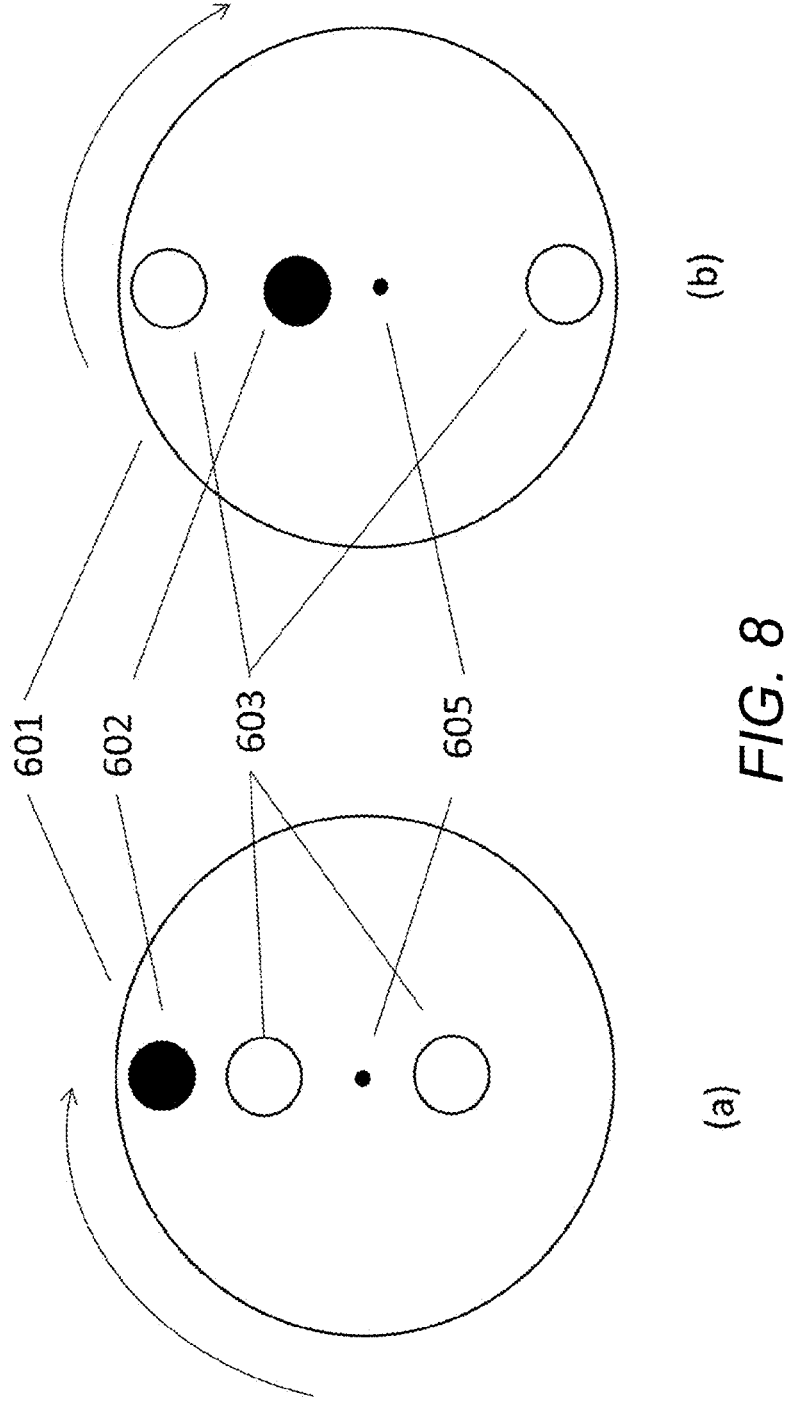
FIGS. 8(a) and 8(b) illustrate two rotatable discs with symmetrical optical features.

FIGS. 8 (a) and 8 (b) are similar to FIGS. 6 (a) and 6 (b), but with two symmetrical optical features, which will typically be optical pass band filters or gas filled cuvette filters. In this case, a balancing compensatory feature (604) is not required, since overall mass symmetry has been preserved.

Figure 9:
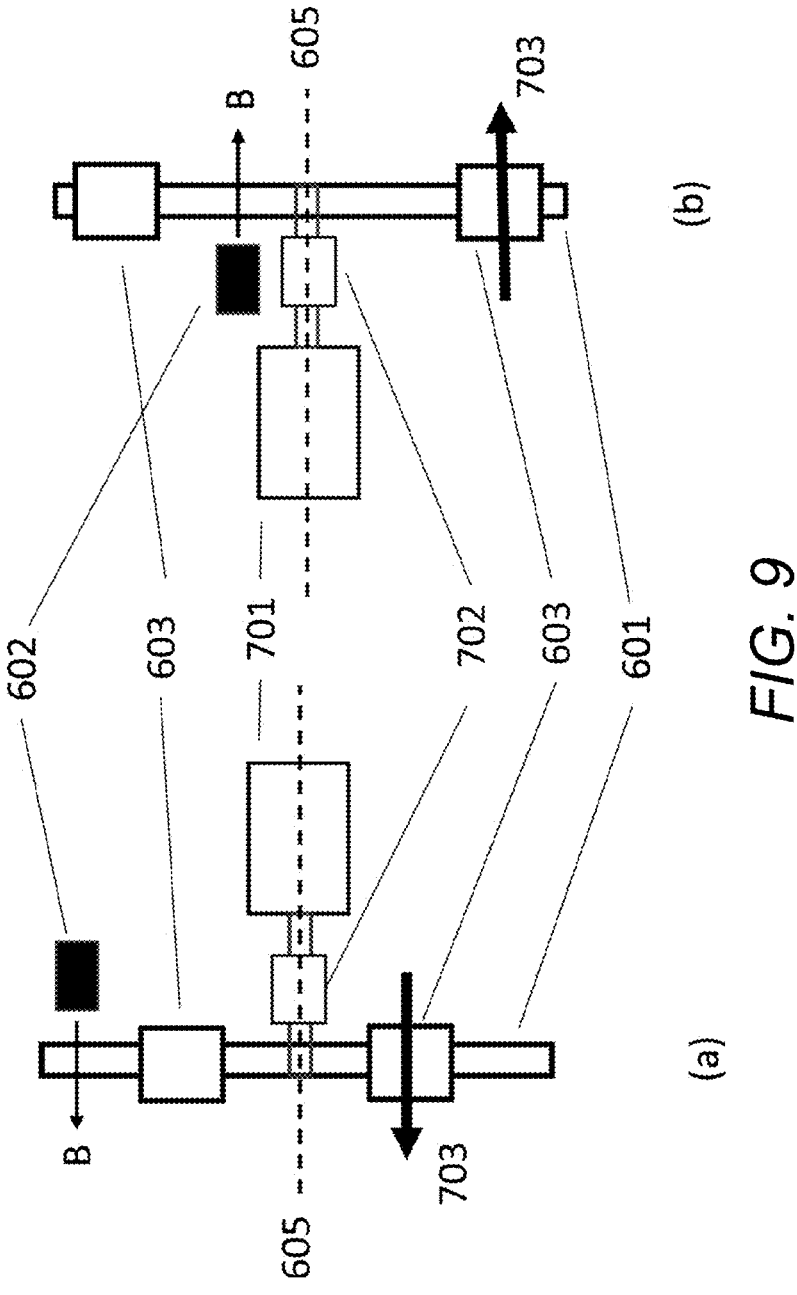
FIGS. 9(a) and 9(b) are cross sectional views of the apparatus of FIGS. 8(a) and 8(b).

FIGS. 9 (a) and 9 (b) are cross sectional views of FIGS. 8 (a) and 8 (b). As shown in FIG. 9, the optical elements such as fluid-filled cuvettes (603) may project beyond the surface of the chopper wheel in a direction parallel to the incident light. This may be helpful to achieve an adequate optical path length within the cuvette to enable absorption, while retaining a low mass chopper wheel. For example, a gas cuvette may be 6 mm in length and longer than the thickness of the main rotating disc of the chopper wheel. The chopper wheel may disc may, for example, a few mm thick and 5-10 cm in diameter.

Figure 10:
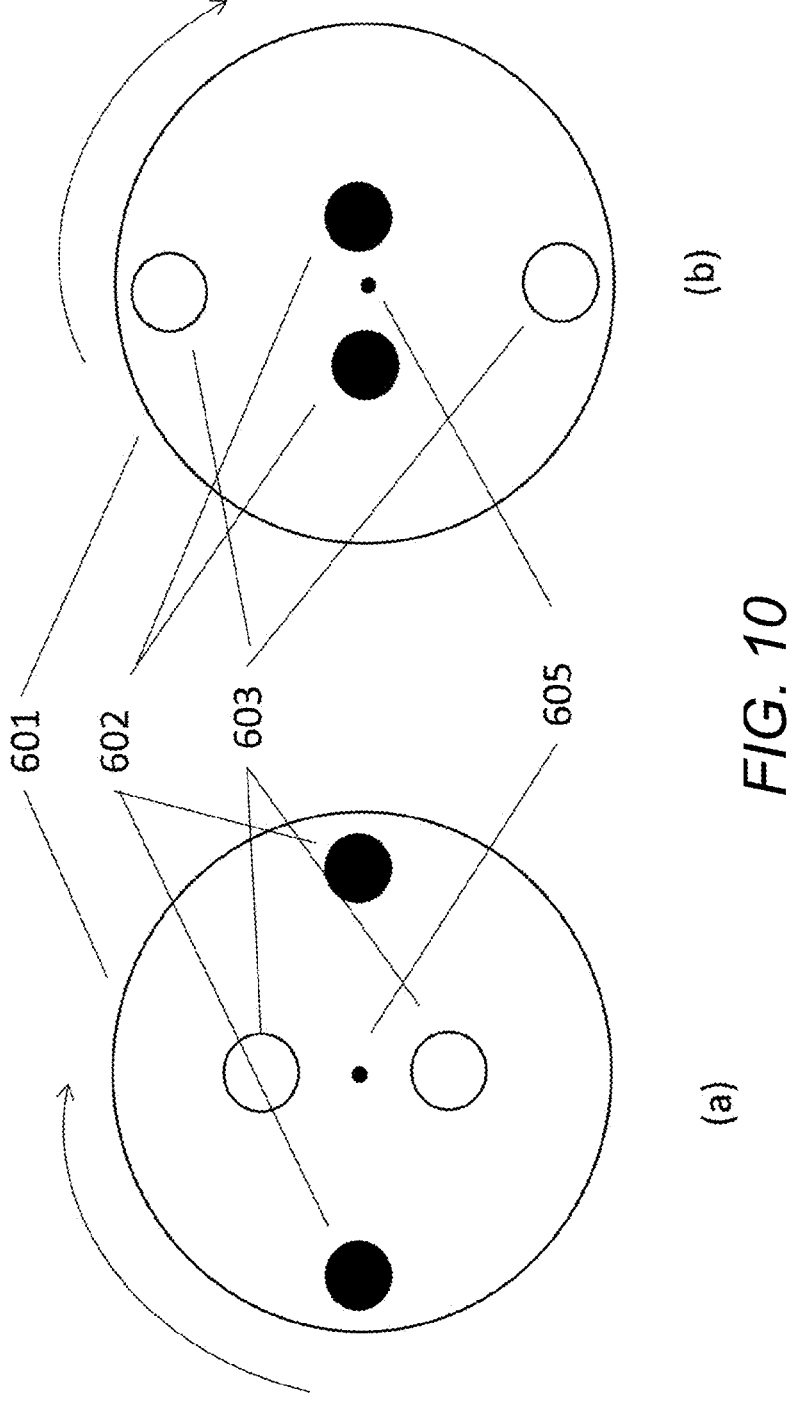
FIGS. 10(a) and 10(b) illustrate two rotatable discs with symmetrically-located magnets.

FIGS. 10 (a) and 10 (b) are similar to FIGS. 8 (a) and 8 (b), but with a pair of identical symmetrical magnets (602) added, instead of a single magnet, in order to double the magnetic drag and also to create greater mechanical symmetry for longevity of the motor and associated bearings.

Figure 11:
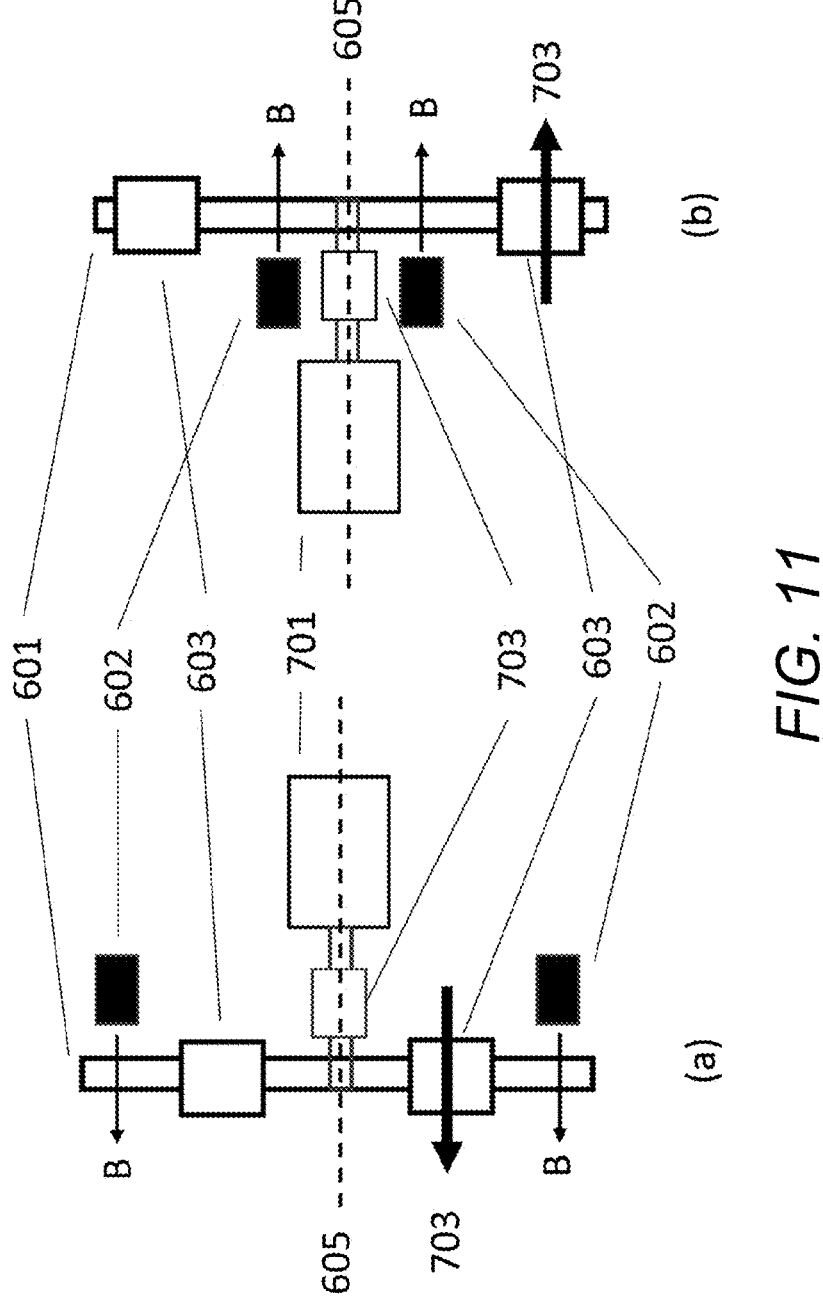
FIGS. 11(a) and 11(b) are cross sectional views of the apparatus of FIGS. 10(a) and 10(b).

FIGS. 11 (a) and 11 (b) are cross sectional views of FIGS. 10 (a) and 10 (b).

Figure 12:
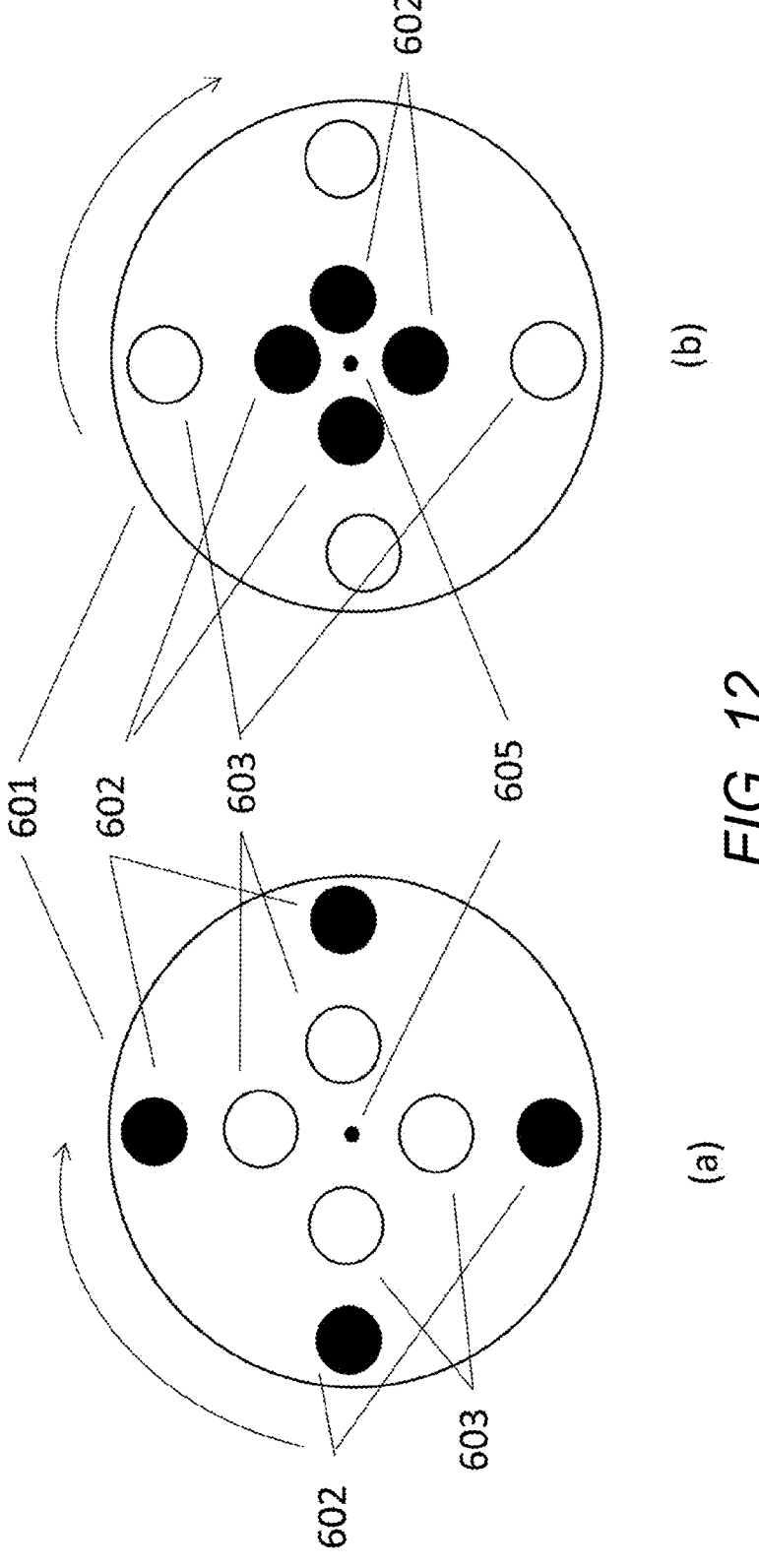
FIGS. 12(a) and 12(b) illustrate two alternative rotatable discs with symmetrical features.

FIGS. 12 (a) and 12 (b) are similar to FIGS. 10 (a) and 10 (b), but with four identical magnets instead of two in a symmetrical arrangement, which again may be useful to increase the magnetic drag force and/or increase the mechanical symmetry. FIG. 12 (b) also shows the presence of 4 optical elements, to obtain multiple spectroscopic measurements during each rotation.

Figure 13:
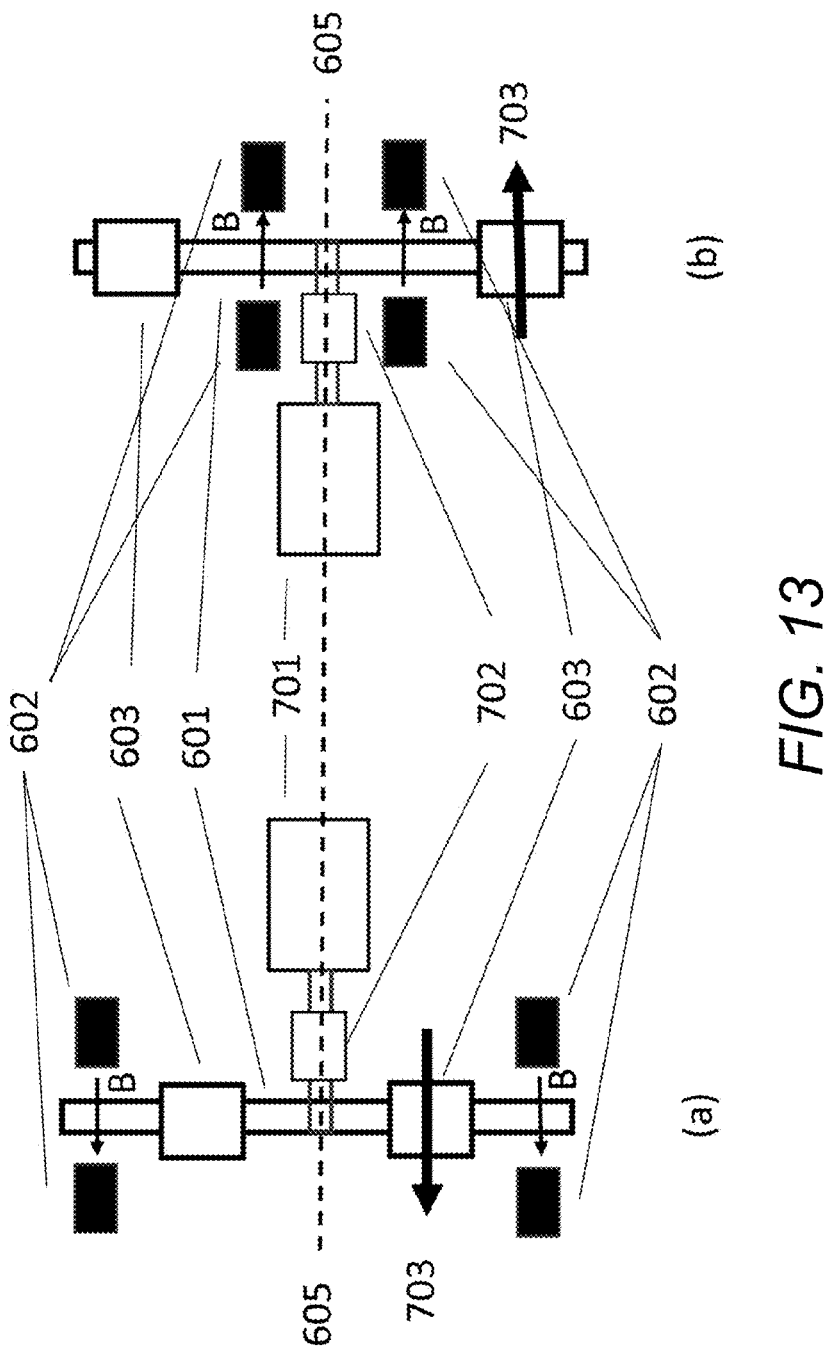
FIGS. 13(a) and 13(b) are cross sectional views of the apparatus of FIGS. 12(a) and 12(b).

FIGS. 13 (*a*) and 13 (*b*) are cross sectional views of FIGS. 12 (*a*) and 12 (*b*).

The potential configurations of the number of magnets (602) and whether they are inside or outside of the optical elements (603) may depend on many considerations, including how much/little magnetic braking force is required, the rotational speed and the size of wheel, disc or cylinder (601) and optical elements (603). The chosen rotational speed will depend not only the required magnetic drag, but also on the optimal performance range of the motor and the response time of the light detectors. Pyroelectric detectors, thermopiles or bolometers, for example, rely on the thermal heating up and cooling down of the detector element and, therefore, their sensitivity is also affected by the illumination frequency as well the intensity and duration.

FIGS. 13 (*a*) and 13 (*b*) show similar configurations to the earlier examples, but where the magnetic field is applied from both sides of the wheel, disc or cylinder.

Figure 14:
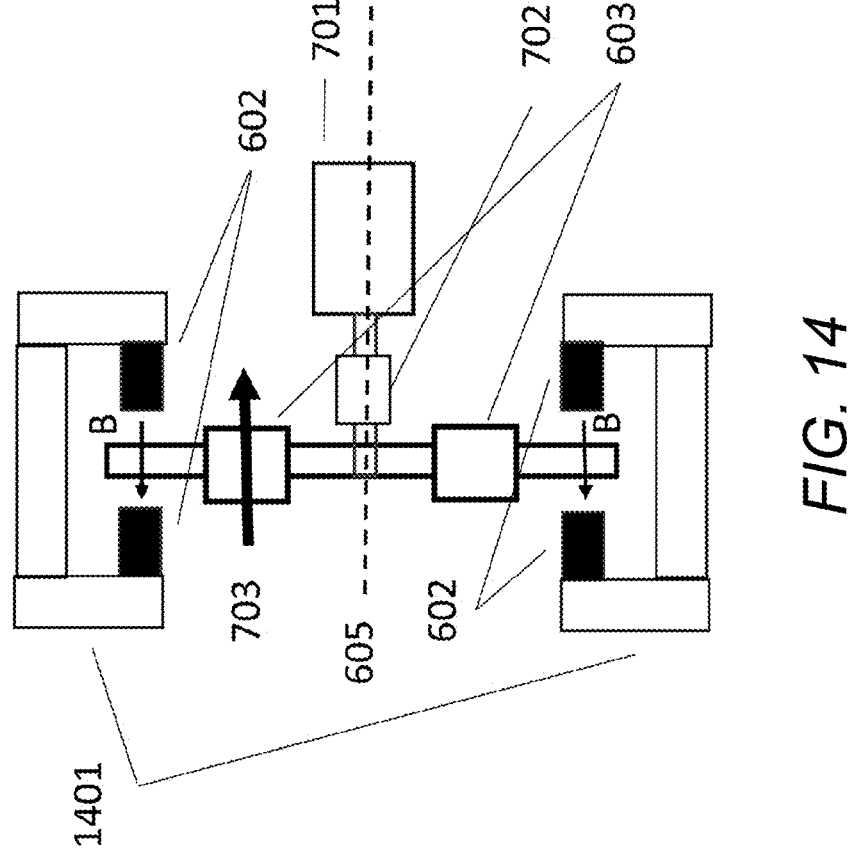
FIG. 14 illustrates an apparatus including a chopper wheel and an arrangement of closely positioned magnets.

FIG. 14 shows using ferromagnetic material (1401) with a pair of permanent magnets or an electromagnet to efficiently shunt magnetic flux and enhance the magnetic field strength through the wheel, disc or cylinder.

Figure 15:
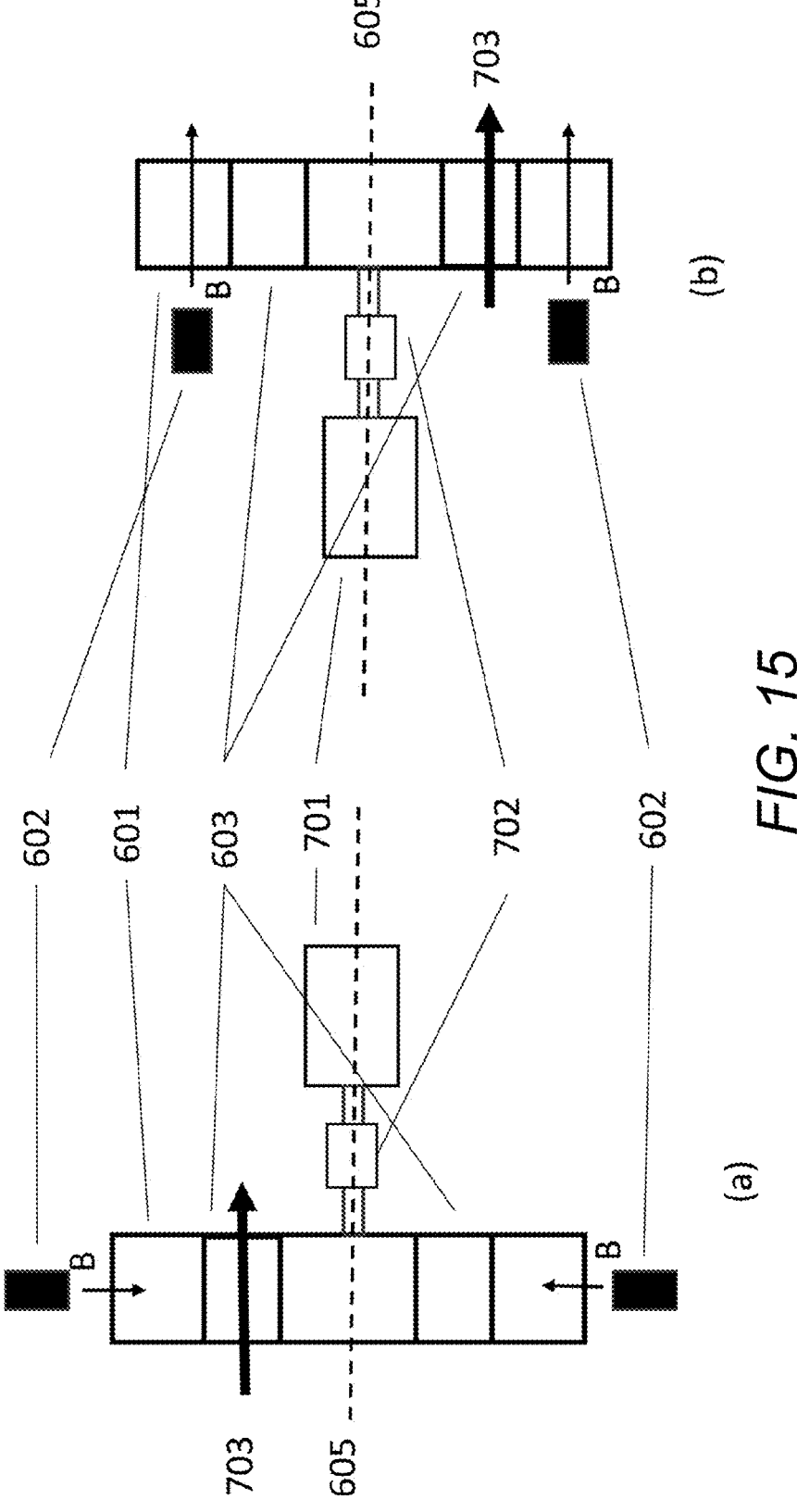
FIGS. 15(a) and 15(b) show example arrangements of magnets with a rotatable optical modulator having a cylindrical format with integrated optical elements.

FIGS. 15 (*a*) and 15 (*b*) show a rotatable optical modulator having a thicker cylindrical format (601) rather than a thin disc format, and where the optical features (603) may be incorporated into the structure of the rotatable cylindrical optical modulator. Due to the thicker format, magnetic braking may be effectively applied from the edge, as illustrated in FIG. 15 (*a*), instead of or in addition to the sides.

Figure 16:
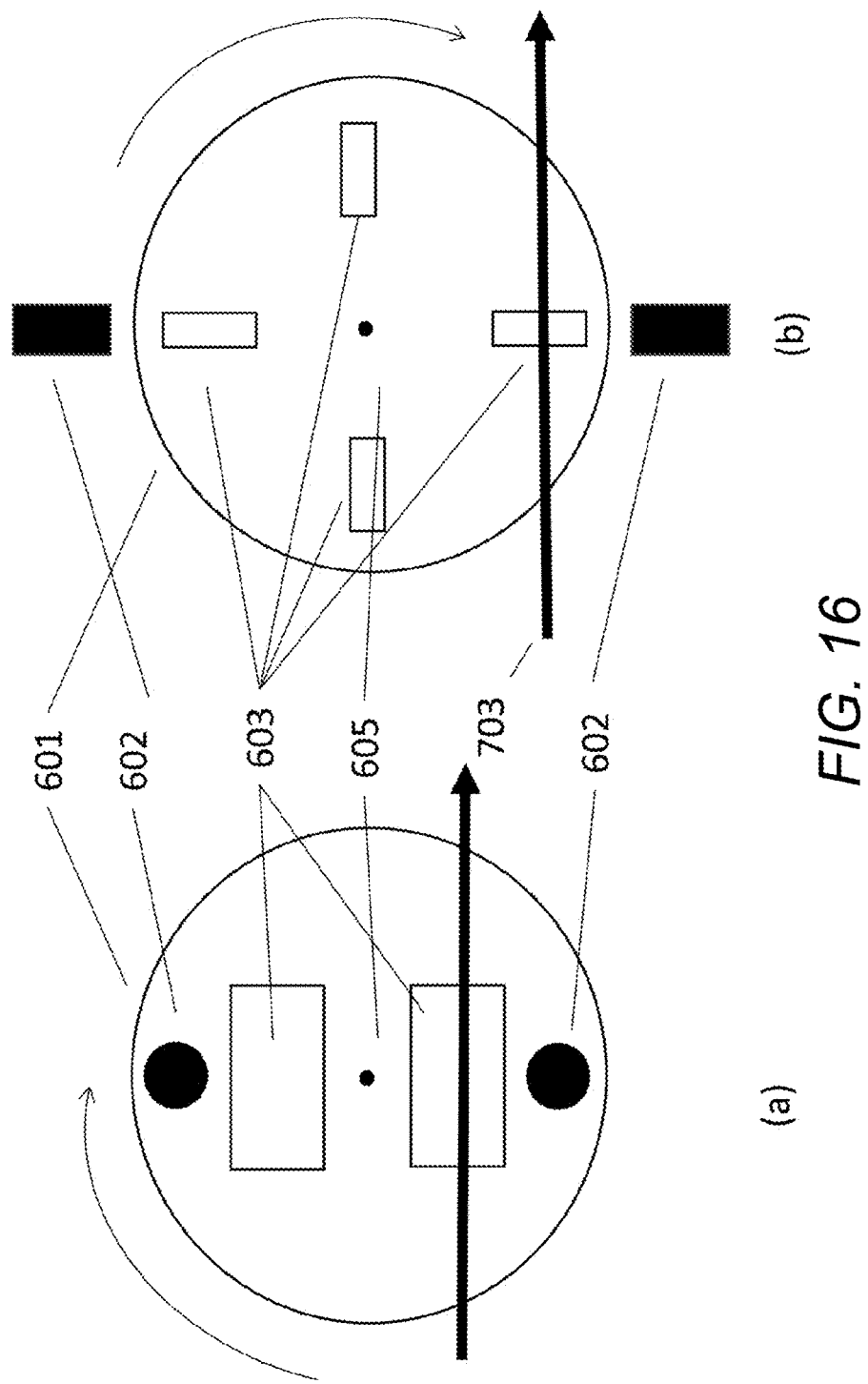
FIGS. 16(a) and 16(b) show alternative arrangements of magnets and a rotatable optical modulator.

FIGS. 16 (*a*) and 16 (*b*) show alternative formats, where the axis of rotation of wheel, disc or cylinder is perpendicular to the incident light instead of parallel.

Figure 17:
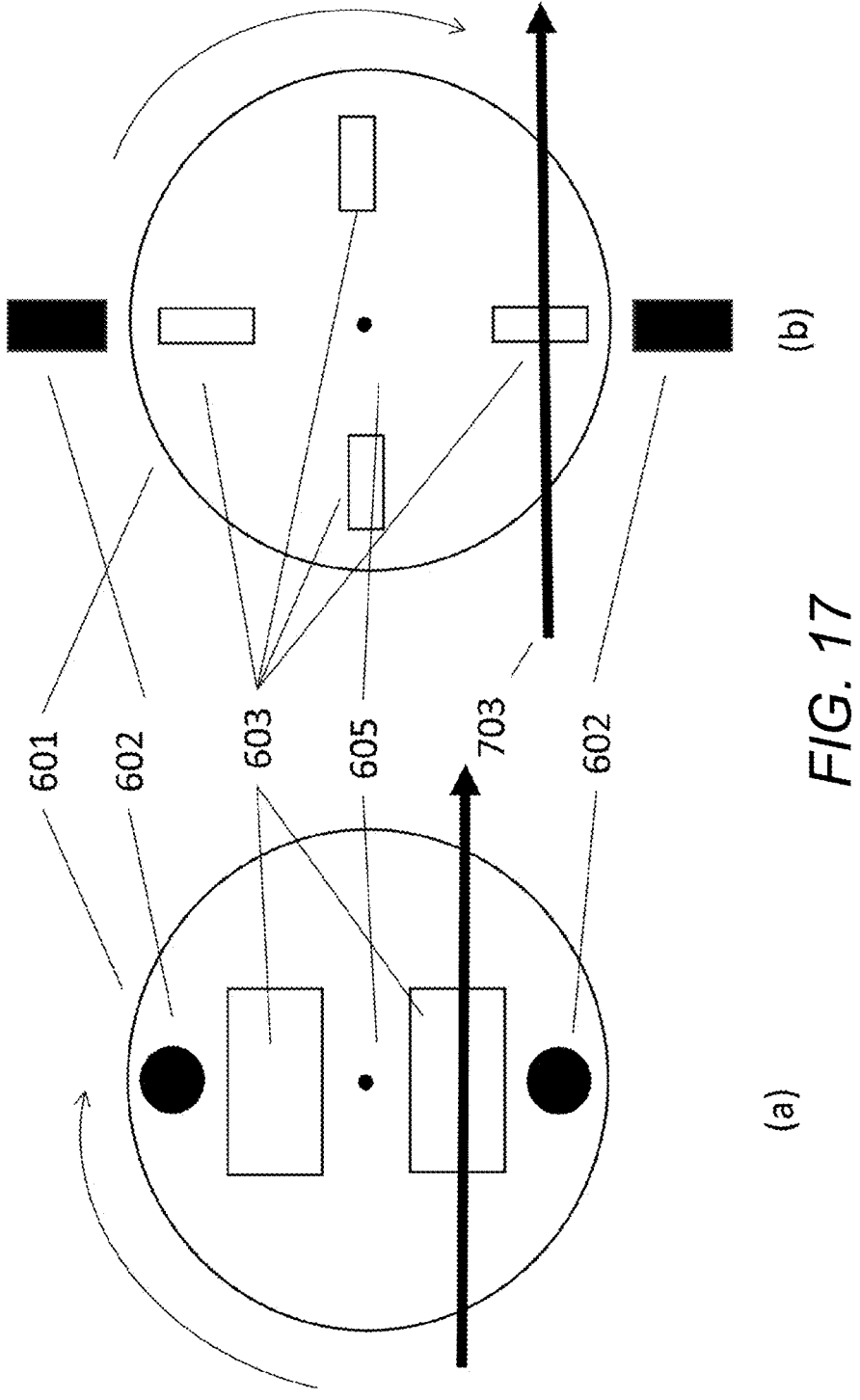
FIGS. 17(a) and 17(b) show cross sectional views of the apparatus of FIGS. 16 (a) and (b).

FIGS. 17 (*a*) and 17 (*b*) show cross sectional views of FIGS. 16 (*a*) and (*b*).

Figure 18:
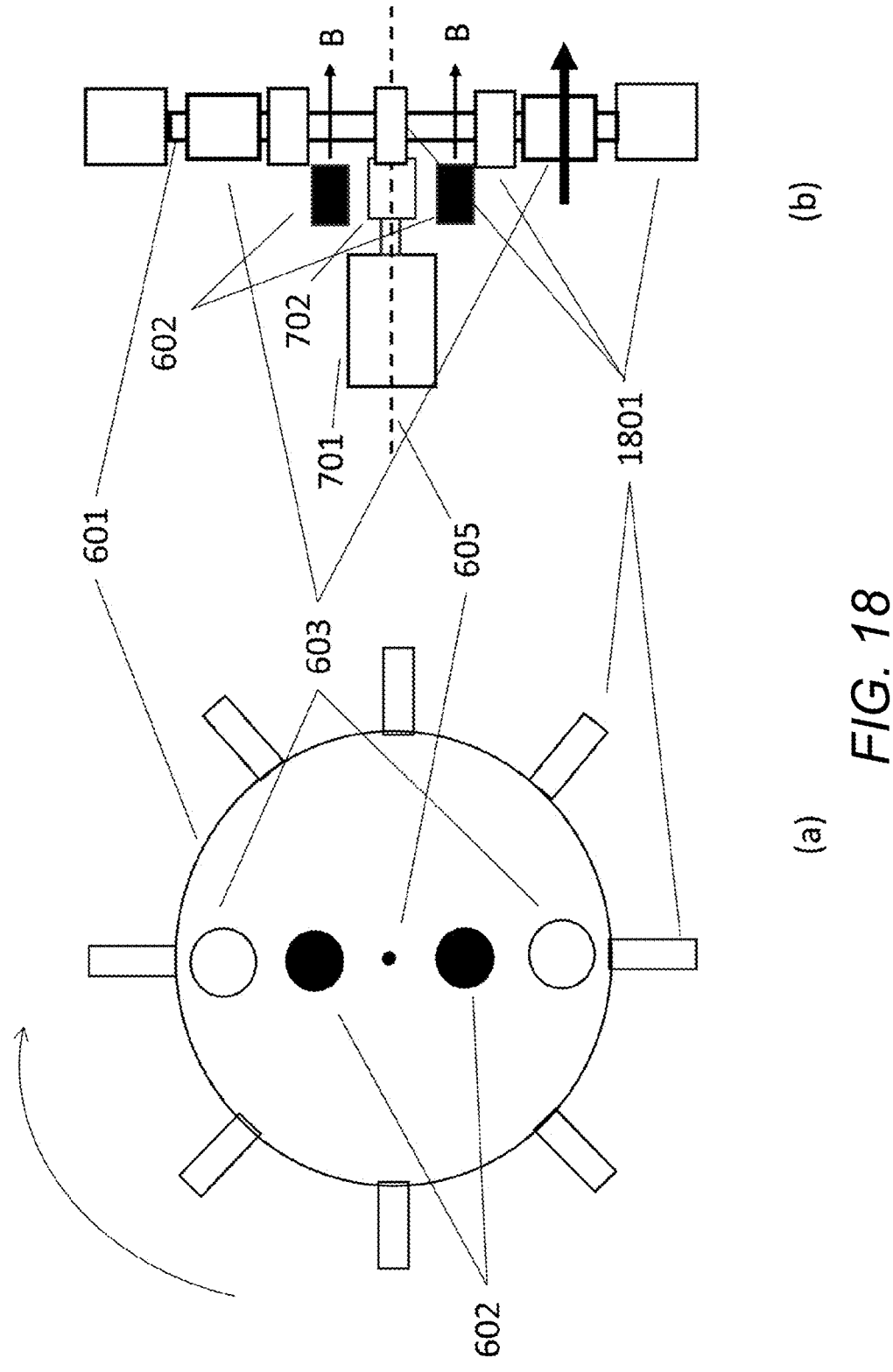
FIGS. 18(a) and 18(b) show an alternative configuration for a chopper wheel with radial projections.

FIGS. 18 (*a*) and 18 (*b*) show the inclusion of features (1801) for adding viscous drag and/or heat loss mechanisms.

Figure 19:
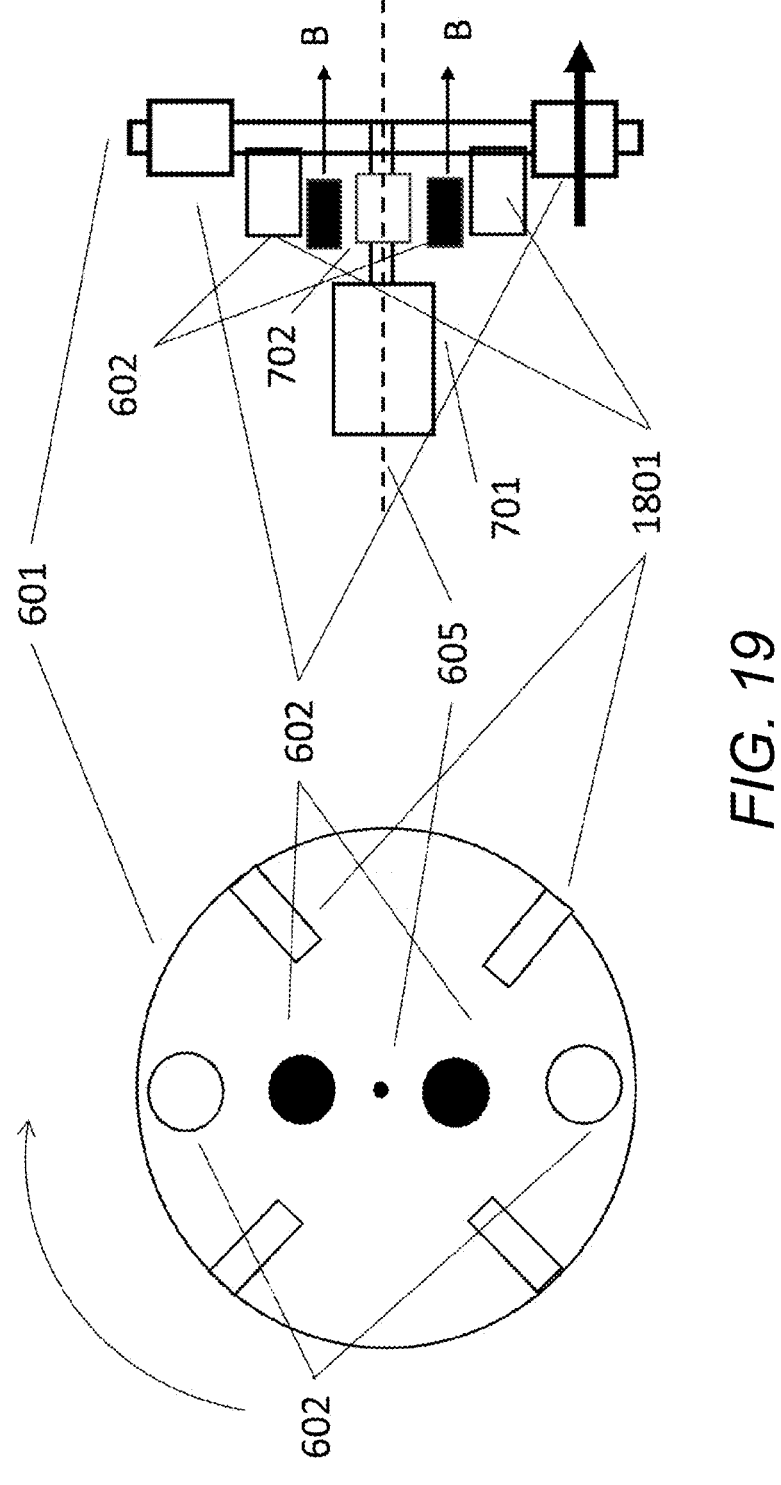
FIGS. 19(a) and 19(b) show an alternative configuration for a chopper wheel with axial projections.

FIGS. 19 (*a*) and 19 (*b*) shows inclusion of these features (1801) inside the perimeter of the disc, however these features could also include radiating, conductive and/or convective loss enhancing features. The wheel, disc or cylinder (601) may also be coated black to enhance radiative losses and/or include surface roughening to increase surface area and/or alter the interaction with the fluid inside the housing.

Figure 20:
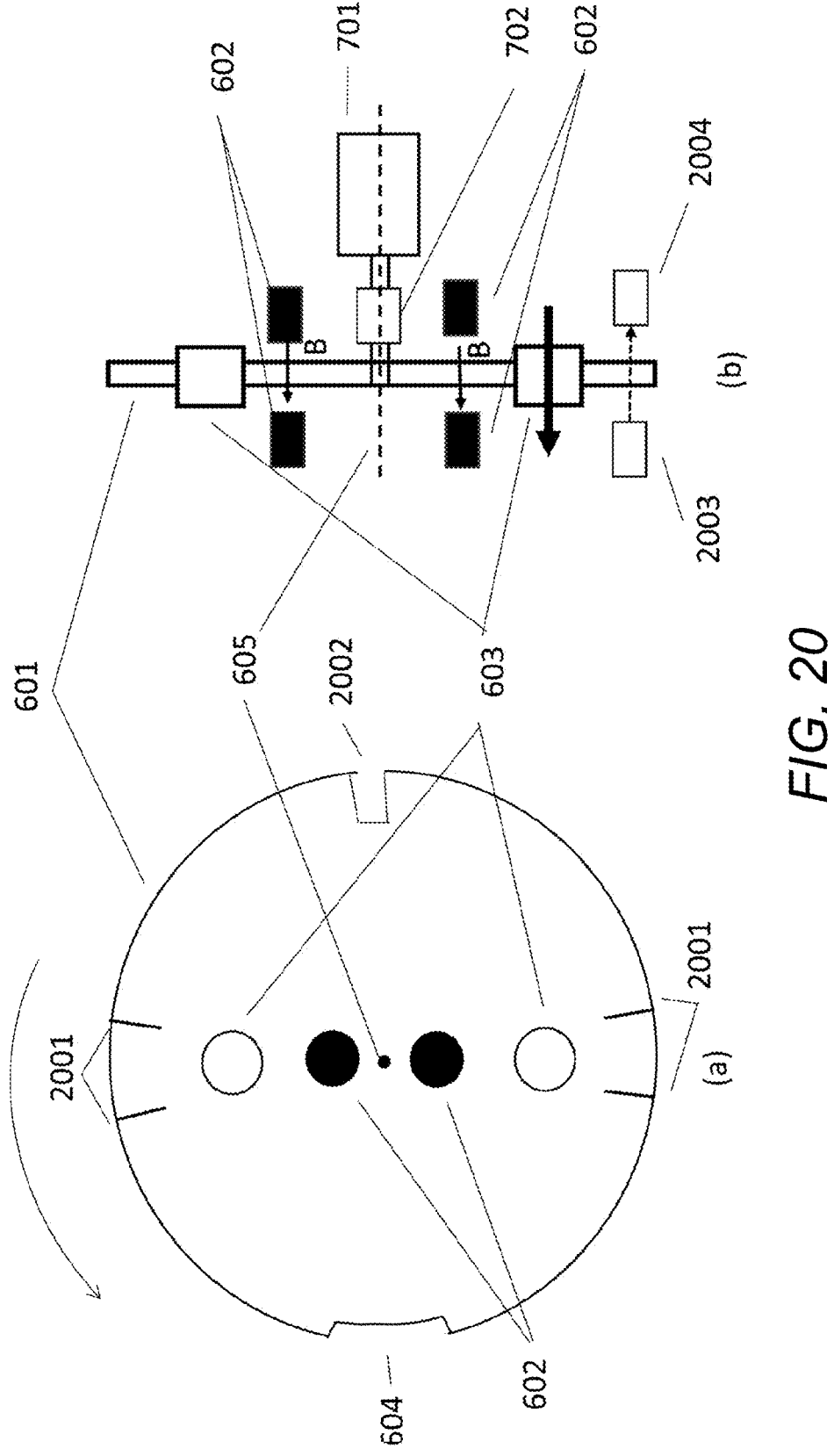
FIGS. 20(a) and 20(b) show an alternative configuration for a chopper wheel with slots in the circumference.

FIGS. 20 (*a*) and 20 (*b*) show the inclusion of features (2001, 2002) for optical (or other suitable method) monitoring of timing and/or location during rotation of a chopper wheel. The illustrated slots may be combined with a sensing system consisting of a light source (2003) and a detector (2004). The light source (2003) and detector (2004) and associated electronics may act as an optical switch enabling, for example, the illumination time to be verified and/or confirmation of the jitter, which could be useful for monitoring and/or motor feedback control and/or signal correction in real time. This has been shown as slits, but could be slots, holes or other suitable profiles and locations. Depending on the application, it may be useful to have an absolute position and/or rotational timing comparison and this could be given by a feature such as shown in 2002. In this case, the identification could be established by giving a wider optical arc than at the other positions (2001) and an imbalance compensation feature (604) could be added on the opposite side of the wheel, disc or cylinder, which is outside of the optical detection zone for the detector (2004). Note that the imbalance compensation feature (604) does not have to be at the outside of the disc.

This example is for illustration only and many other suitable methods may be used including optically reflective, some and magnetic methods.

Figure 21:
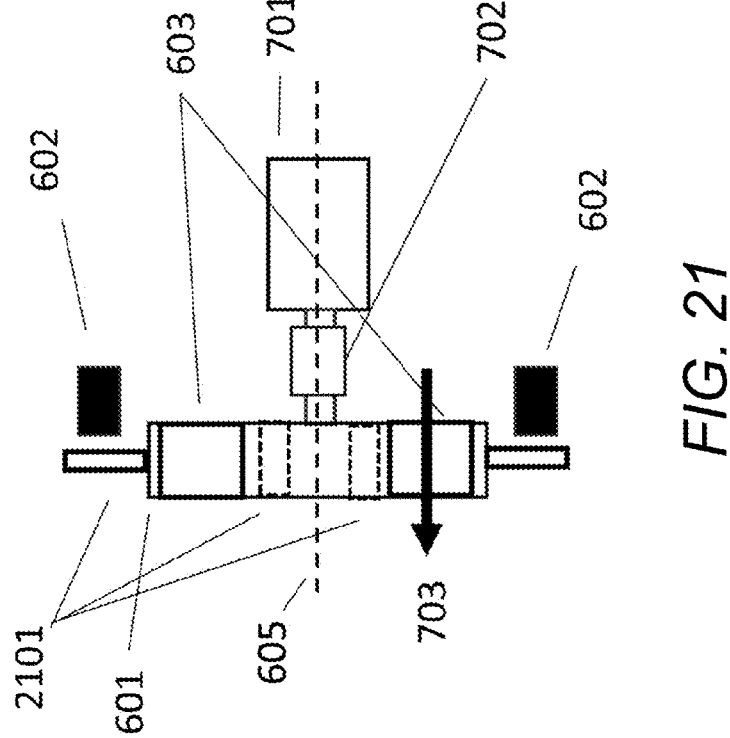
FIG. 21 shows an alternative configuration for a reduced-mass rotatable optical modulator with magnets at the circumference.

FIG. 21 shows thinned out or cut-through features (2101) in the wheel, disc or cylinder (601), which can serve to minimise the associated mass of the wheel, disc or cylinder and hence reduce its rotational inertia, since the moment of inertia will be proportional to the mass at that radius and the square of the distance from the centre of rotation.

Figure 22:
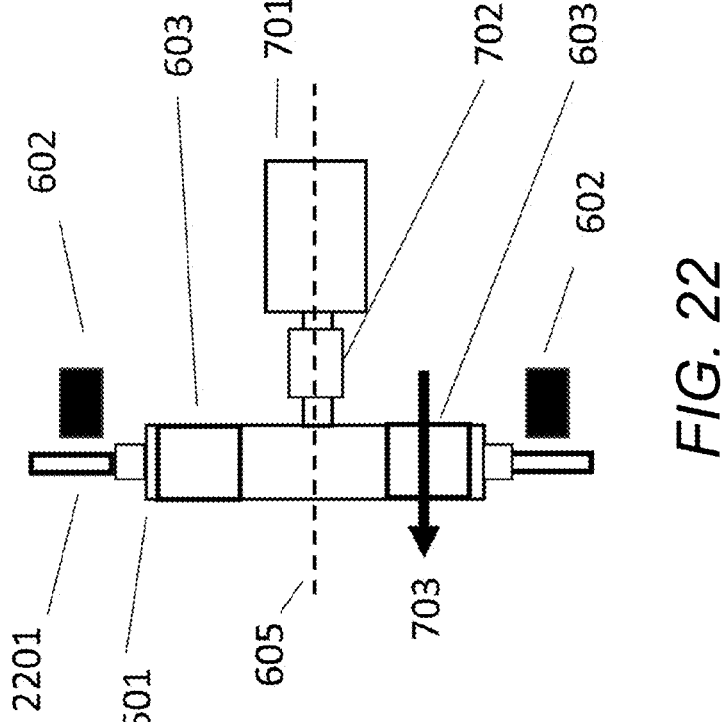
FIG. 22 shows an alternative configuration for a rotatable optical modulator with an electrically conductive ring at the circumference.

FIG. 22 shows a composite construction wheel, disc or cylinder (601), where a non-electrically conductive wheel, disc or cylinder has an outer electrically conductive ring (2201) for magnetic braking. Note the location of this feature (2201), could be at any suitable location on the wheel, disc or cylinder.

Figure 23:
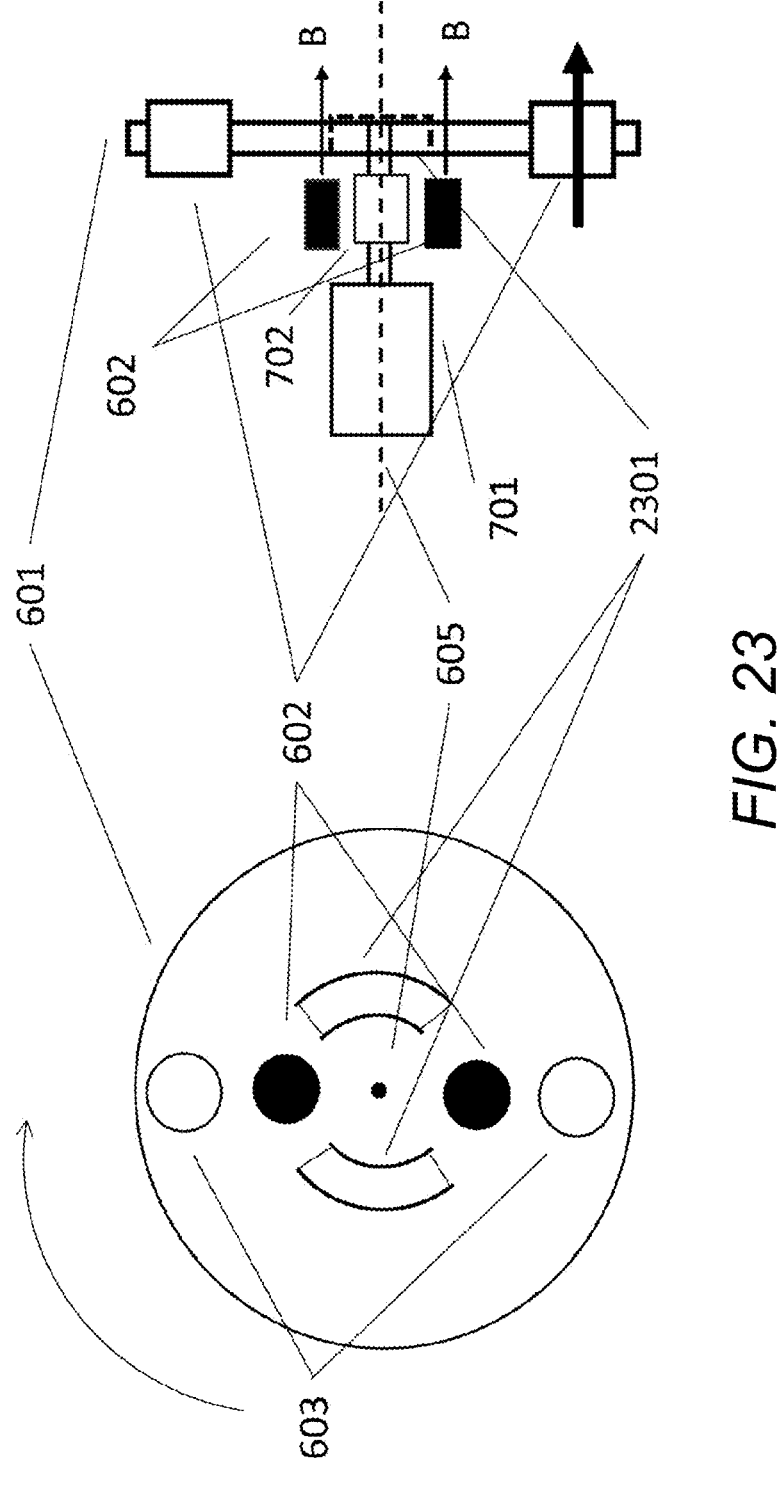
FIG. 23 shows an alternative configuration for a rotatable optical modulator.

FIG. 23 shows the inclusion of features (2301), which may modulate the braking force and hence the angular velocity within a rotation. This might be desired to modulate the dark/exposed time of the detector. Such features could be achieved by several means including thinning out and/or cut-throughs of the material and/or increasing the thickness of material in segments.

Some preferred embodiments may preferentially be mounted vertically, since aligning the axis of rotation parallel to gravity will eliminate the asymmetry of the gravitational load of the wheel, disc or cylinder on the motor.

Figure 1:
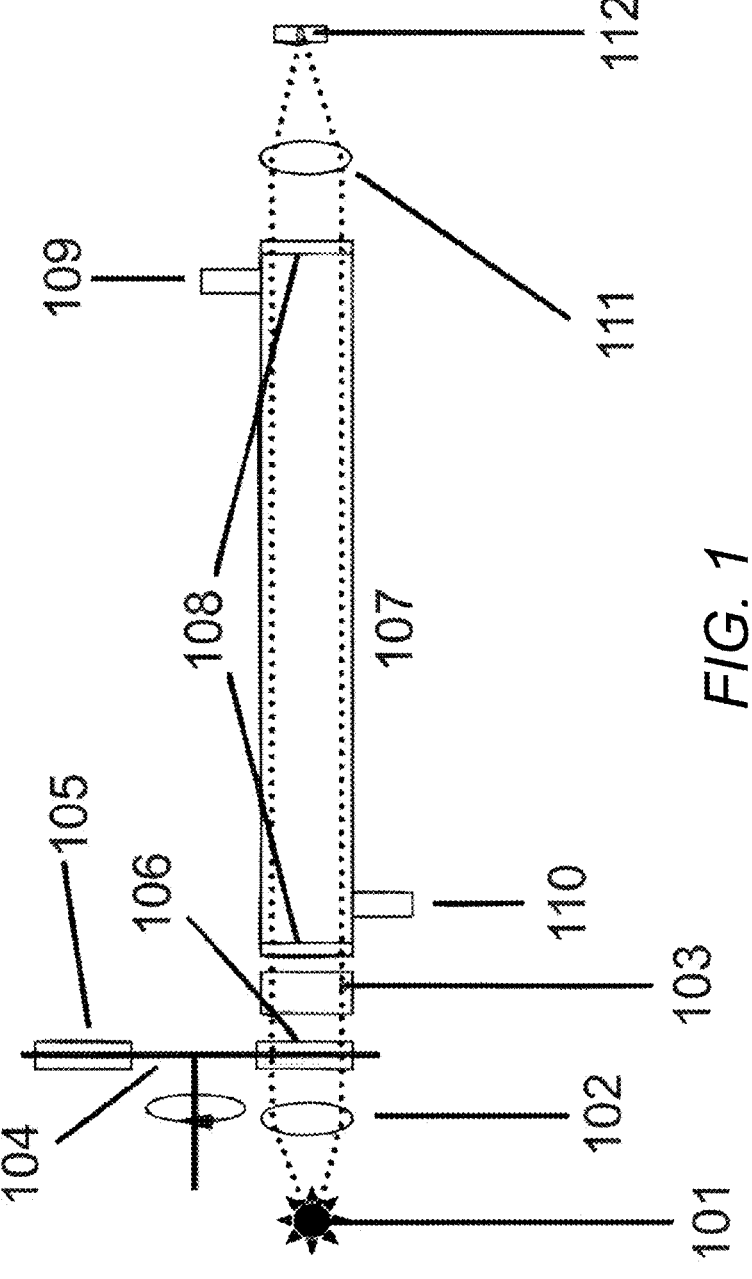
FIG. 1 provides an illustration of an example optomechanical system for use in gas filter correlation (GFC) measurement.
Figure 2:
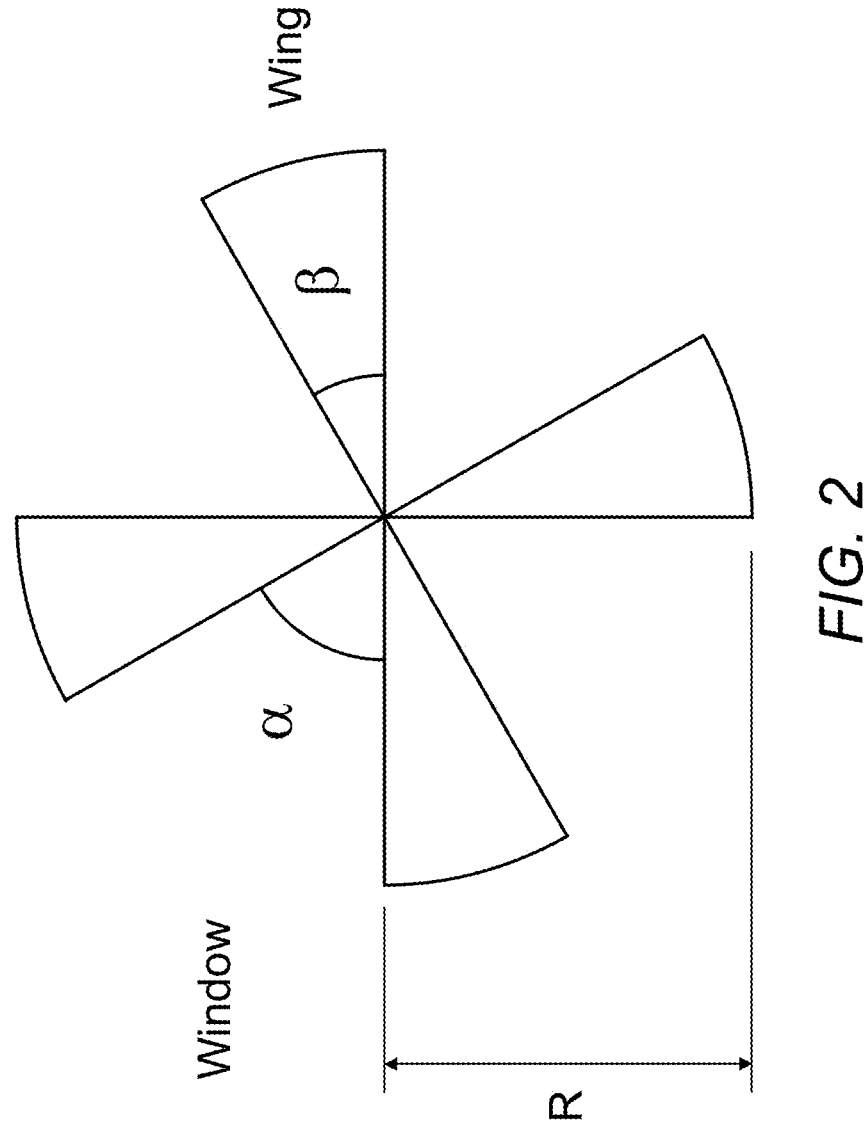
FIG. 2 provides an illustration of chopper wheel with regular apertures.
Figure 3:
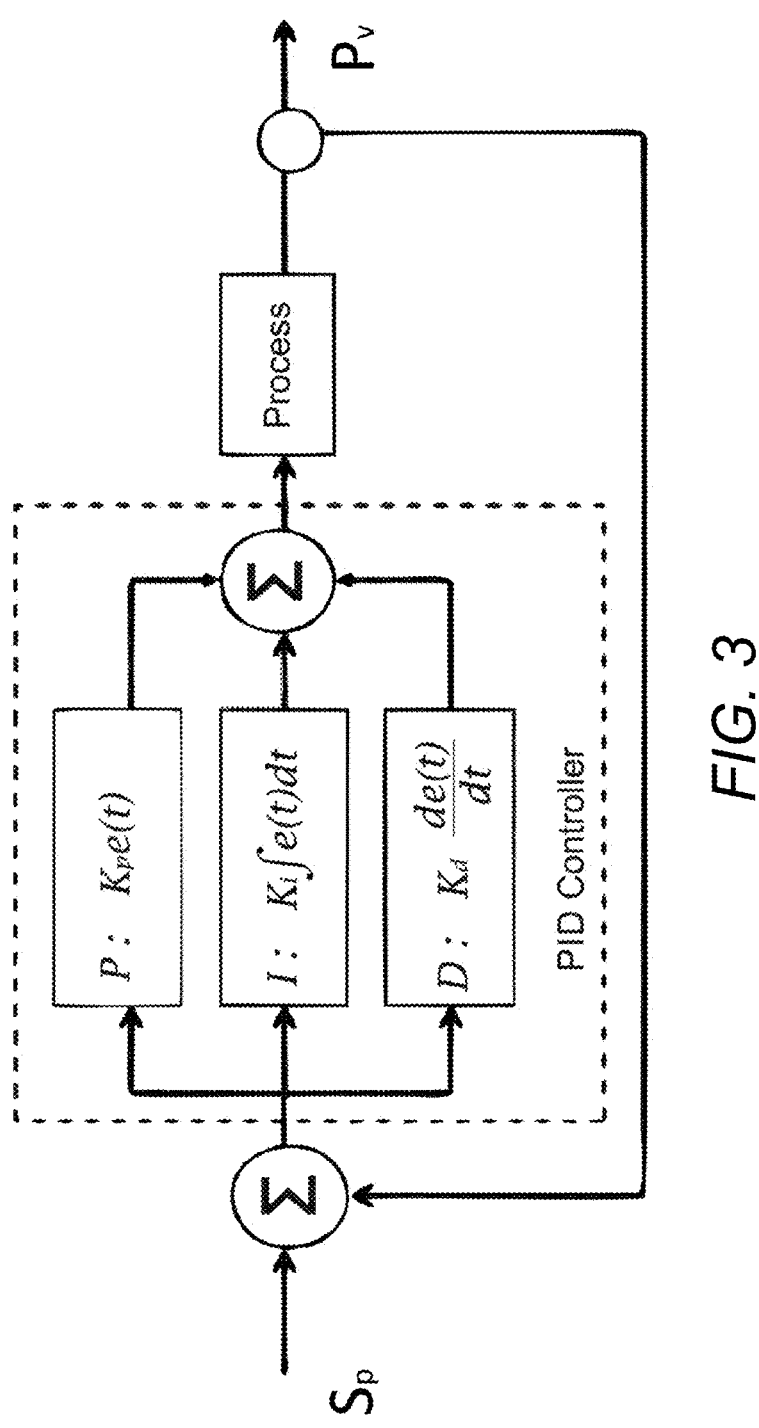
FIG. 3 provides an illustration of a block diagram of a PID controller in a feedback loop.
Figure 4:
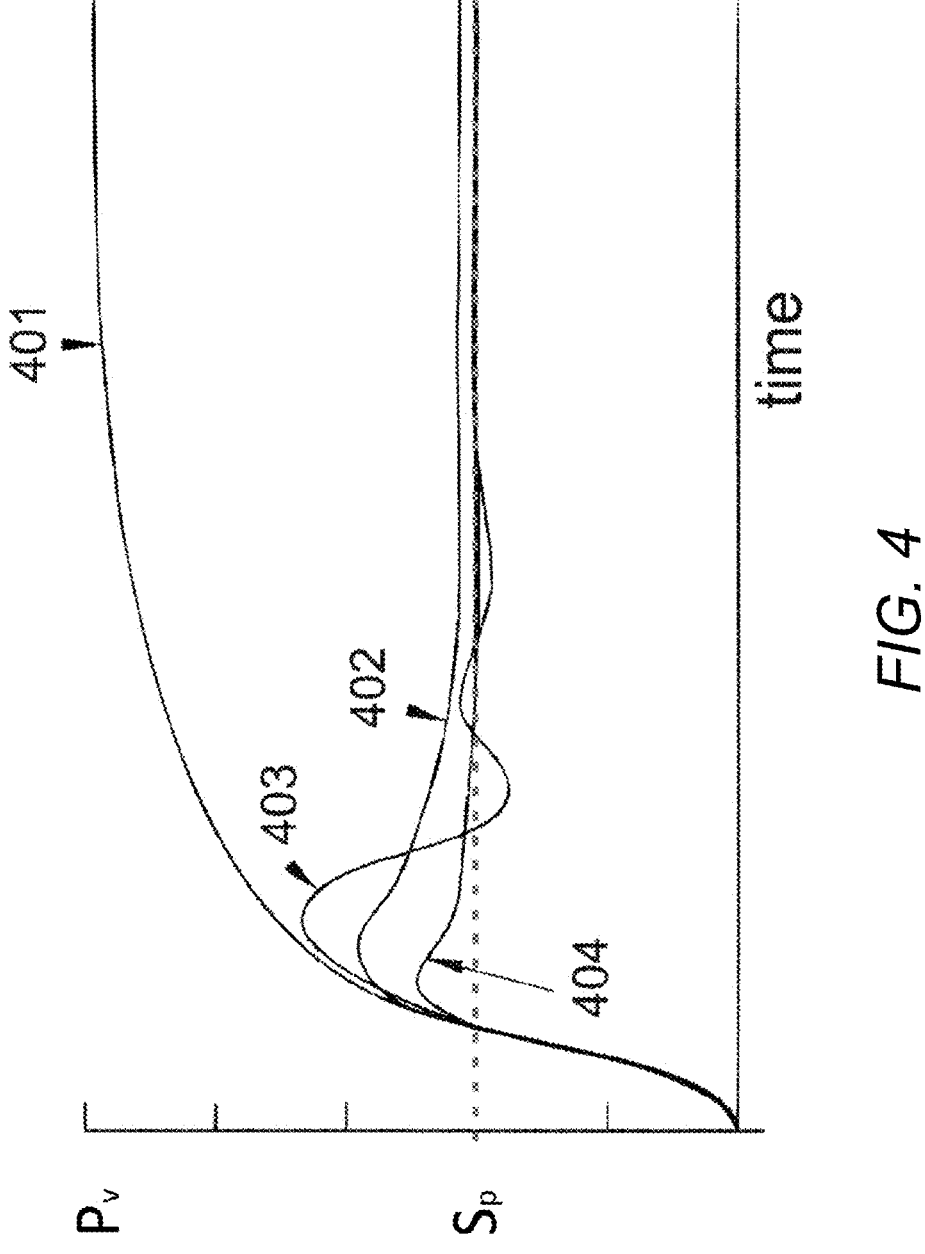
FIG. 4 provides an illustration of a step response of Pv to step change of Sp vs time.
Figure 5:
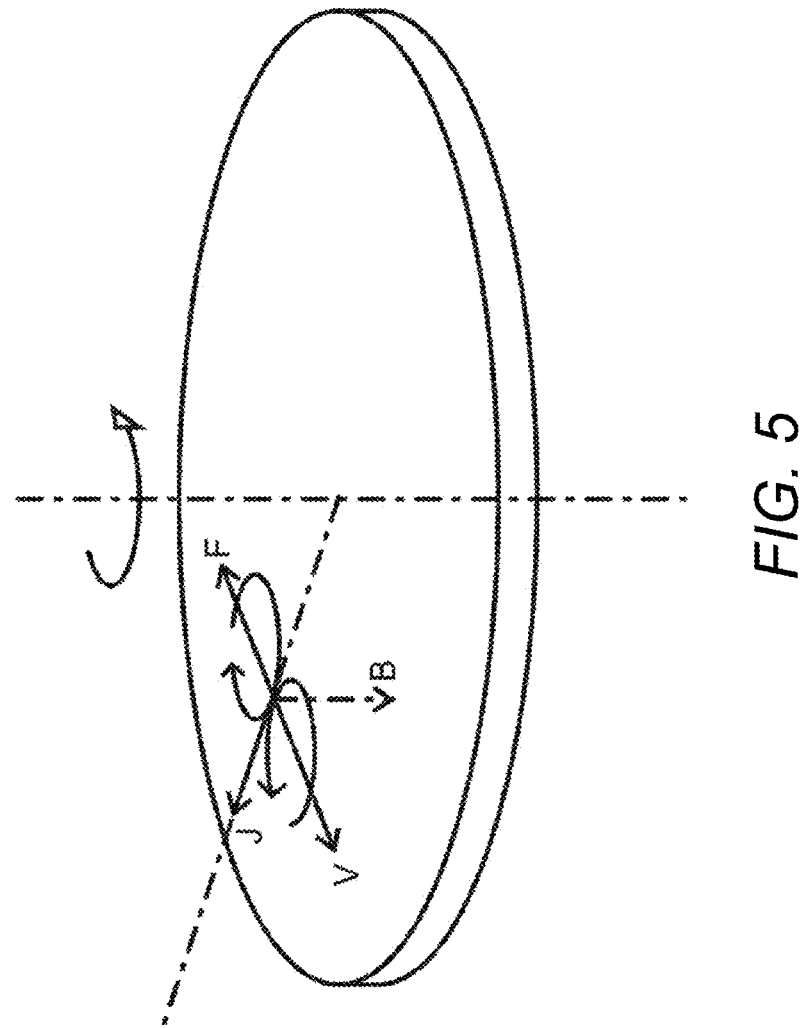
FIG. 5 provides an illustration of a rotating disc in a magnetic field and the generation of eddy currents.
Figure 24:
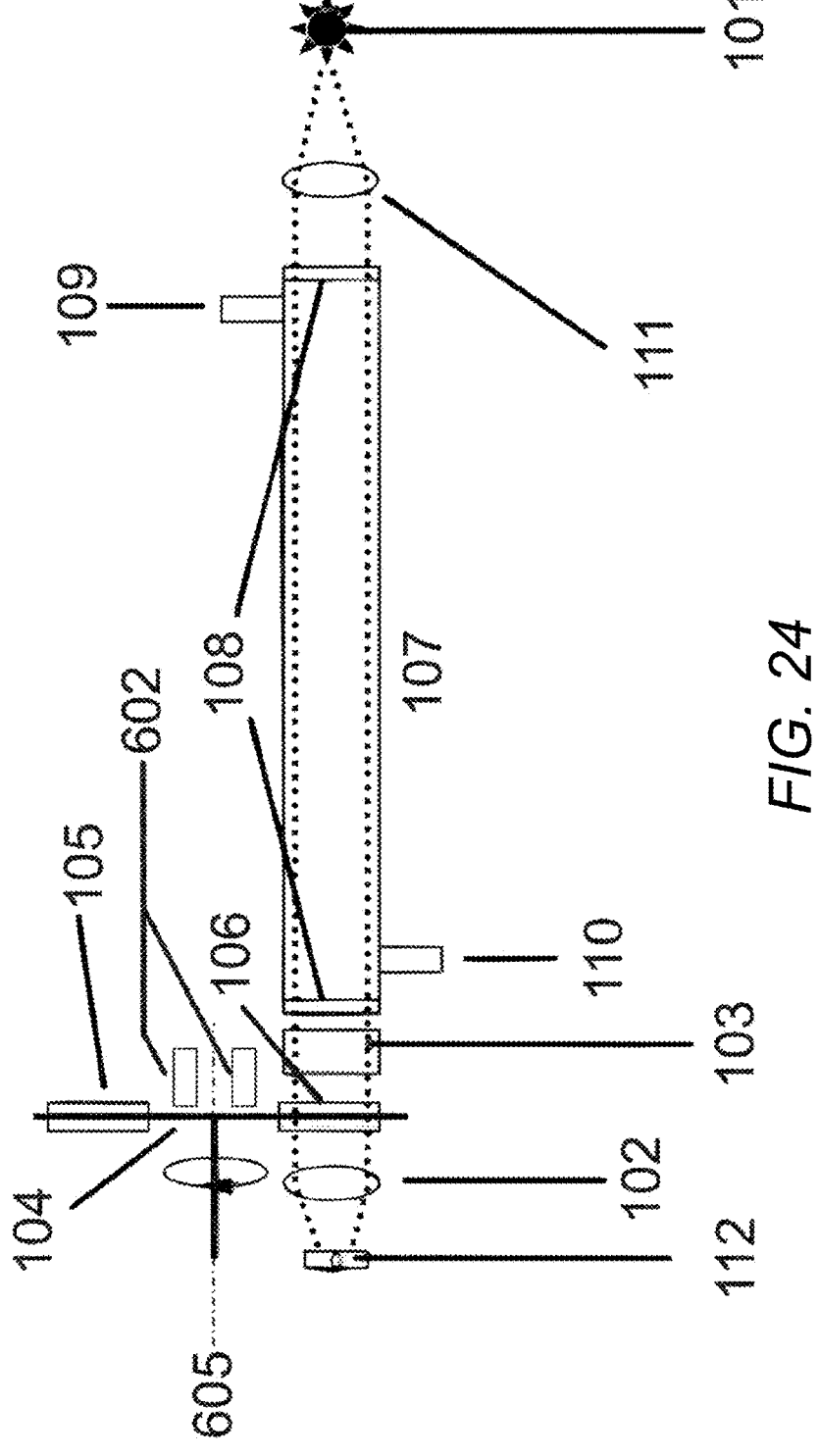
FIG. 24 shows an example optomechanical system for use in a gas filter correlation (GFC) measurement, incorporating magnetic braking.

FIG. 24 shows a similar set-up to FIG. 1, but with the new magnetic braking method (602) employed. Note that the location of the wheel, disc or cylinder could be by the source, by the detector or anywhere within the optical route from source to detector depending on design and application requirements.

Figure 25:
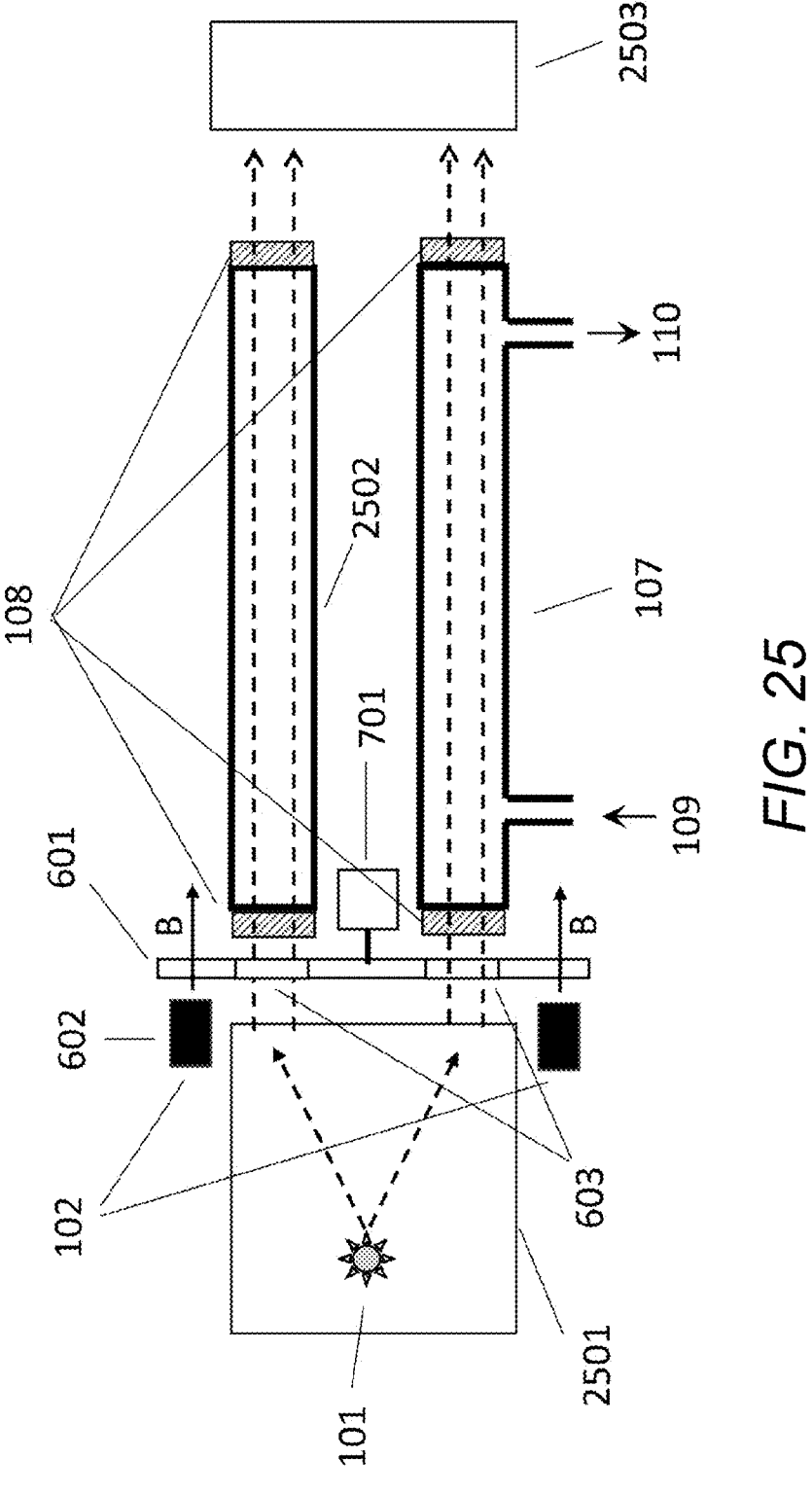
FIG. 25 shows an apparatus suitable for use in non-dispersive infra-red spectroscopy.

FIG. 25 shows an alternative apparatus for use in a non-dispersive infra-red (NDIR) method. Light from a broadband source (101) is split into two equal, parallel beams by a beam splitting means (2501), which could be reflective, refractive or combination in nature. One of these two parallel beams, the reference, is directed down a reference cell (2502) pathway filled with an optically non-absorbing gas within the wavelength range of interest, such as nitrogen and sealed at each end by optical elements (108), such as windows or lenses. The other parallel beam, the measure, is directed down the sample cell (107), sealed at either end by identical optical elements (108). Means are provided for sample entry (109) and sample exit (110) to the sample cell (107). A chopping disc (601) containing at least one optical element (603), which may be an aperture, window or pass band filter is rotated by a motor (701) and magnetic braking is applied to the rotating disc by the presence of magnets (602), as shown. A suitable detector (2503), which may be a Luft detector or micro-flow detector filled with the gas of interest to provide selectivity, is present at the end of the cells to detect and/or compare the transmitted radiation from the measure and reference paths, as the chopper wheel rotates. The reference beam intensity will be unattenuated, whilst the measure path will be reduced by the presence of the measurand in the sample and, from this difference, the measurand concentration can be deduced.

Figure 26:
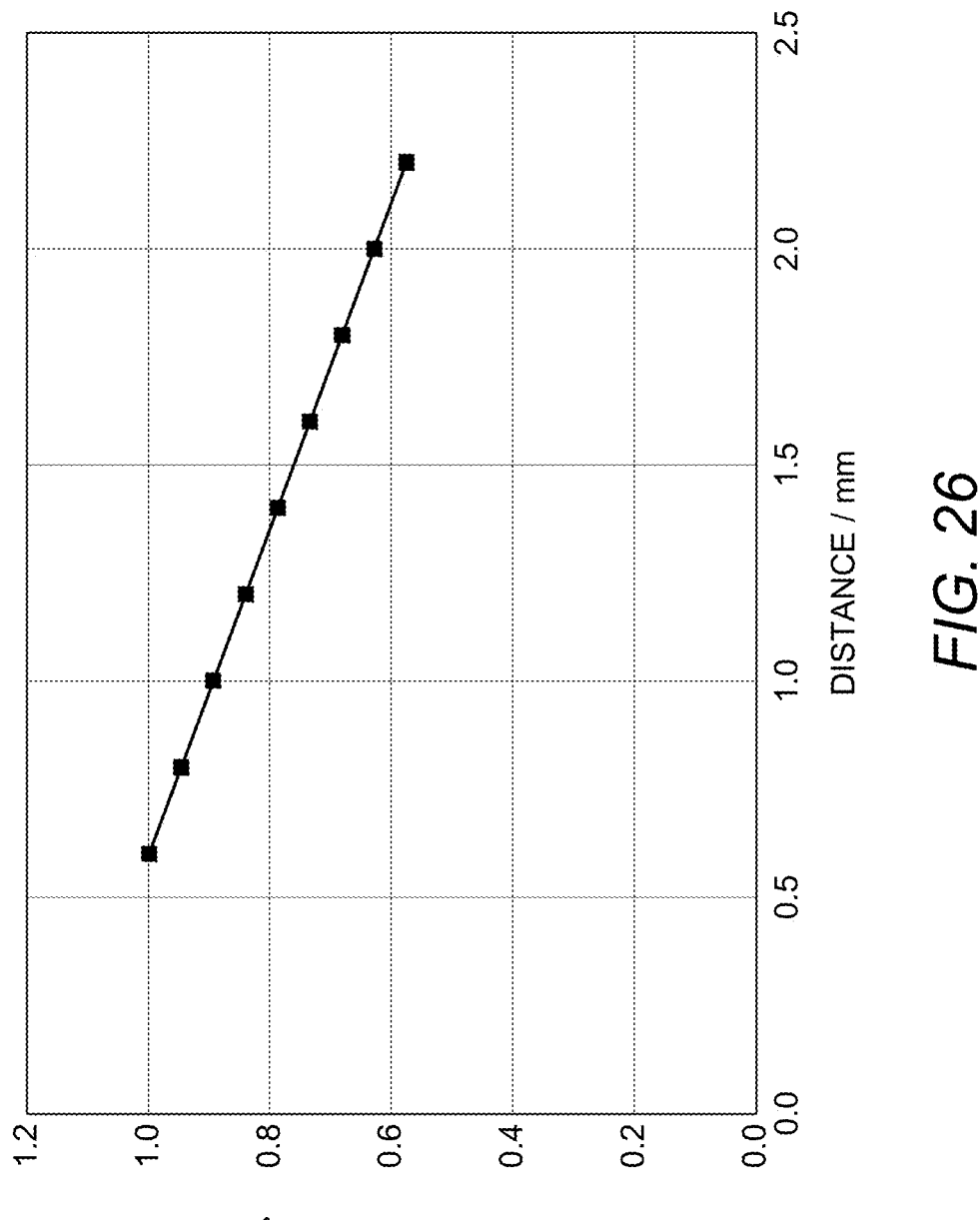
FIG. 26 is a graphical representation of the power needed by an electric motor to maintain the same speed of rotation of an example aluminium disc with variations in the distance of two permanent magnets.

FIG. 26 shows experimental results for investigating the effect of distance away from an aluminium disc of a pair of symmetrically placed permanent magnets, similar in set-up to FIGS. 10 (*b*) and 11 (*b*) with PID control of the motion using a brushless DC motor. This shows that increasing power is required to be applied to the electric motor to maintain the same speed as the magnets get nearer to the disc and hence exert a stronger braking effect. It can be seen that, in this configuration, the relationship of power with distance is linear. This is strongly influenced by the mechanical arrangement of this configuration and magnets' relative size and shape and the small distance away from the rotating disc.

Figure 27:
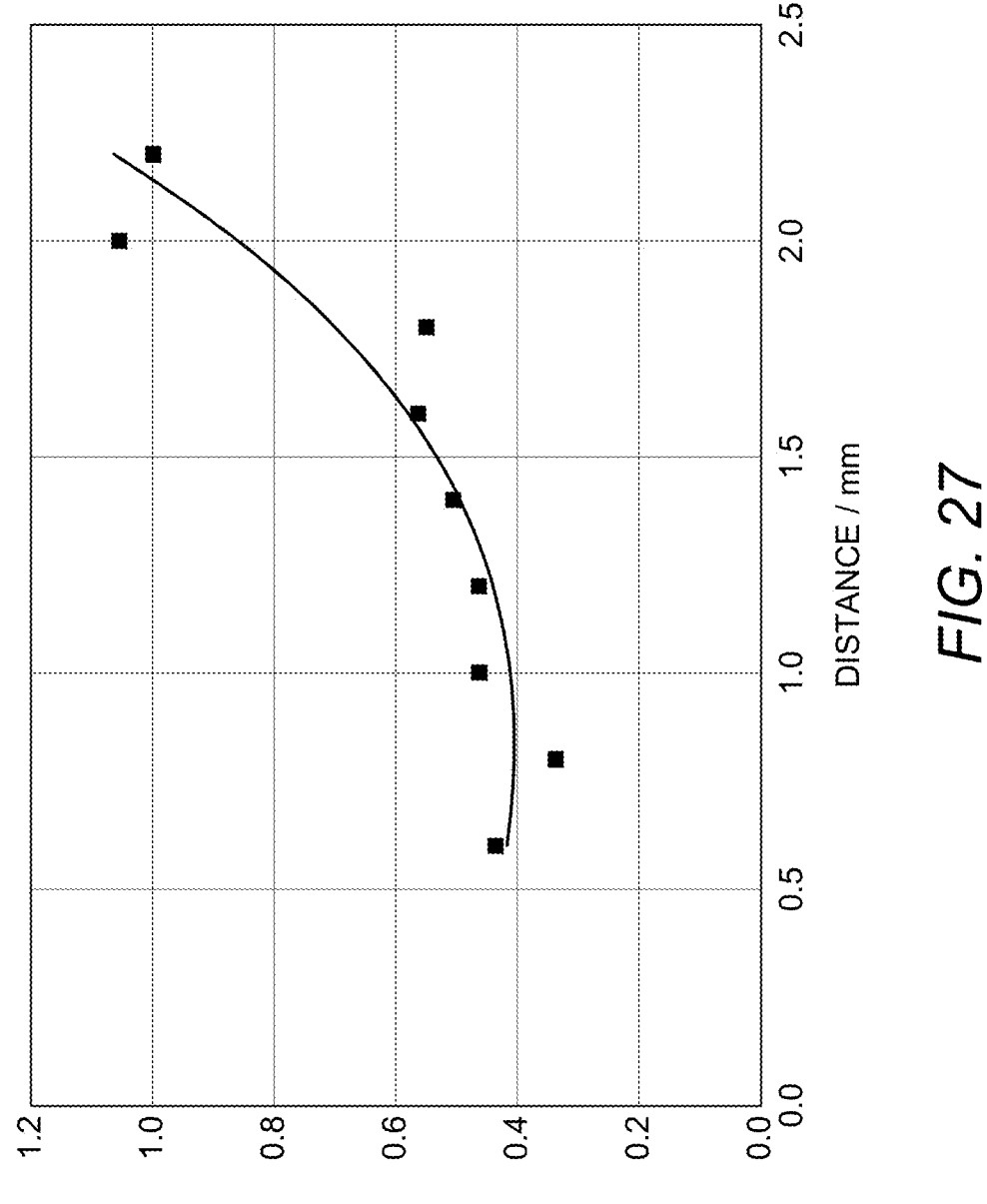
FIG. 27 is a graphical representation of the effect of the distance of the magnets on rotational movement jitter, for the system of FIG. 26.

FIG. 27 shows the effect on the jitter (average extrema) obtained for the system of FIG. 26, using the same PID parameters. With no magnetic braking applied, low jitter at the desired rotational speed is not possible. It can be seen that the stability of the system increases (indicated by a decrease in the jitter observed) as the magnetic braking is increased, however, there will be an optimal distance range where a sufficiently low jitter is obtained, whilst not requiring too much electrical power (or exceeding the power specification of the motor) or heat generation by the motor and there are also mechanical considerations, such as practical clearance gaps, taking manufacturing tolerances into account. In this case, a distance in the region between 0.6 and 1.6 mm was determined to be suitable. Having taken account of power usage, positional tolerance and clearance, a separation distance of about 1 mm was selected for one example implementation.

Typical separation distances from the magnets to the optical modulator can be, for example, between about a few tenths of a mm to a few cm, due to positional tolerancing limits and the decrease of the magnetic field strength with distance respectively. Typical modulator sizes will range from about 1 cm to a few 10 s of cm, whilst the rotational speeds will typically be from about 1 Hz up to a few 100 s of Hz. Permanent magnetic field strength will vary according to size, shape, and material but may be in the range from a fraction of a Tesla to several Tesla, whilst electromagnetic field strength can vary widely dependent on many factors including material composition, number of turns and electrical current supplied.

Figure 28:
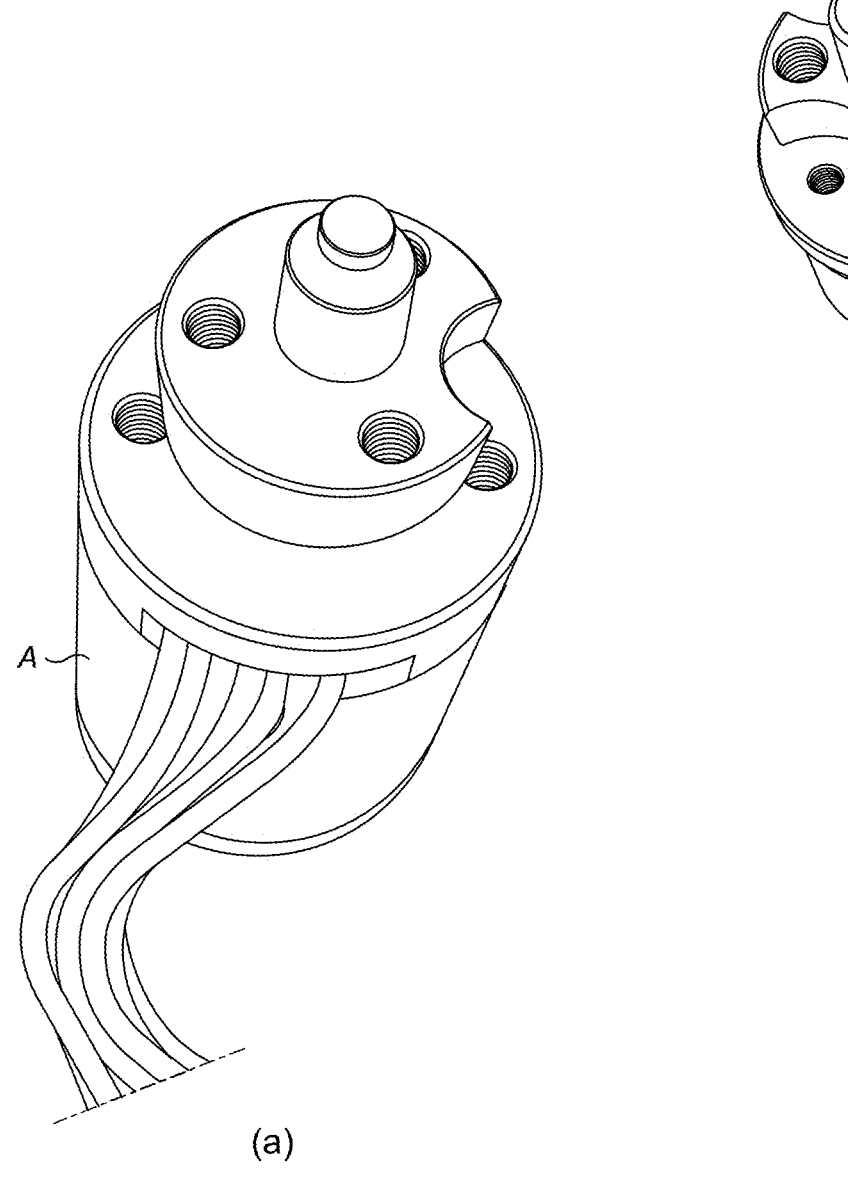
FIG. 28 shows two example driver motors with different mass, as used for empirical testing.
Figure 28:
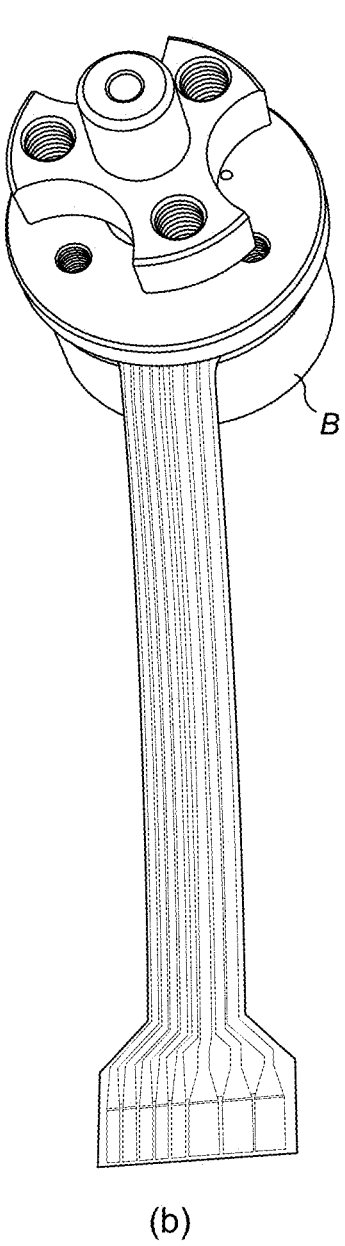

This innovative solution was tested empirically by comparing the performance of two motors A and B, driving the same chopper disc by means of a PID rotational speed controller. In this comparison, test Motor A had a significantly higher rotor mass and rotational inertia compared to Motor B, as can be seen in FIG. 28.

For the purposes of this comparison, the PID parameters were optimised for Motor A and subsequently used without any alteration for Motor B.

Figure 29:
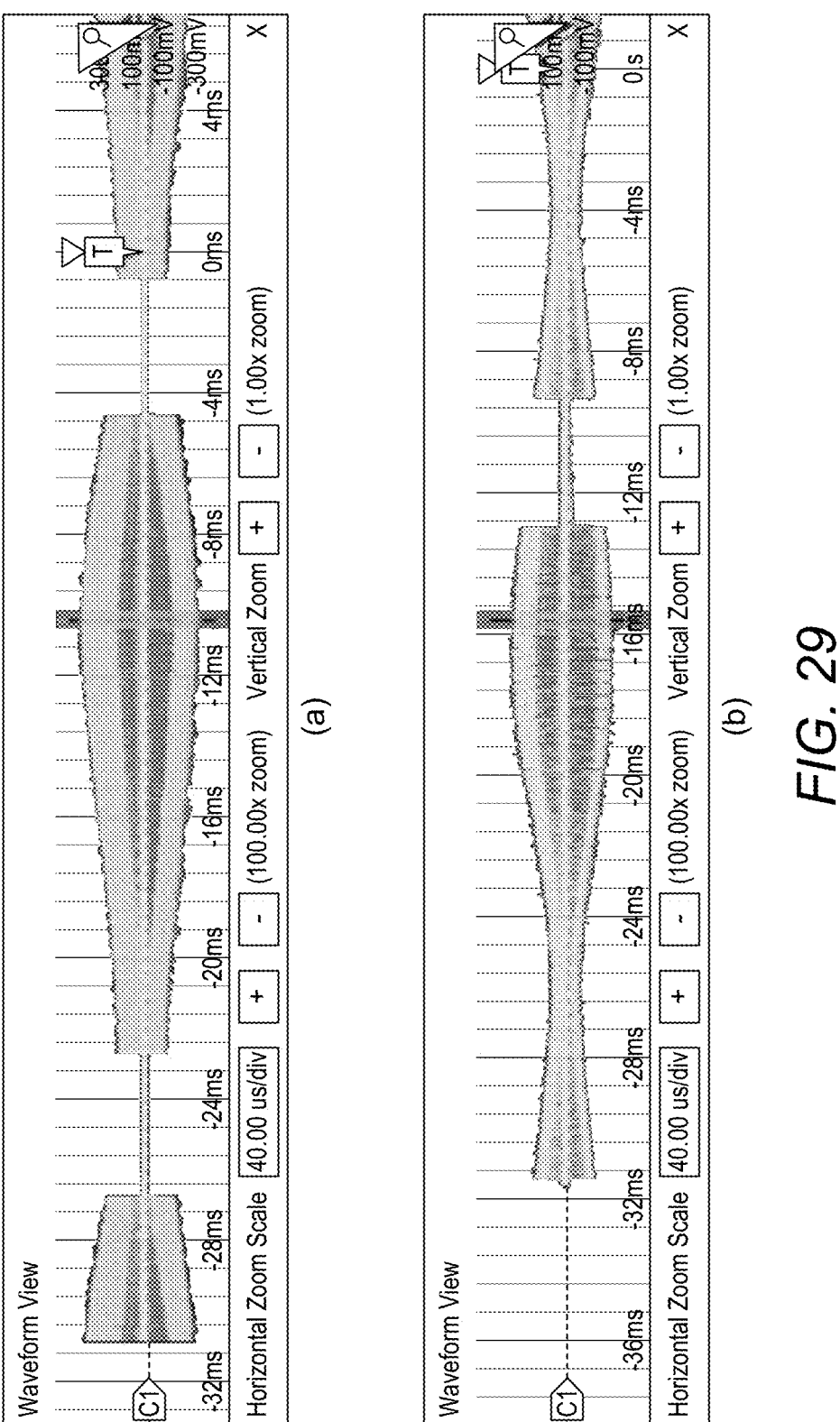
FIGS. 29(a) and 29(b) show the drive signals to each of the motors of FIG. 28.

During the testing of Motor A, no magnetic field was present. After the rotational inertia of the combined wheel and motor is overcome at start-up, the controller inhibits the motor drive and waits until the wheel slows down sufficiently by natural frictional forces. In fact, the chopper wheel and the Motor A rotor act as a flywheel during the graph flat line. This is illustrated in FIG. 29 (*a*), which shows the drive signal to Motor A with respect to time.

Figure 30:
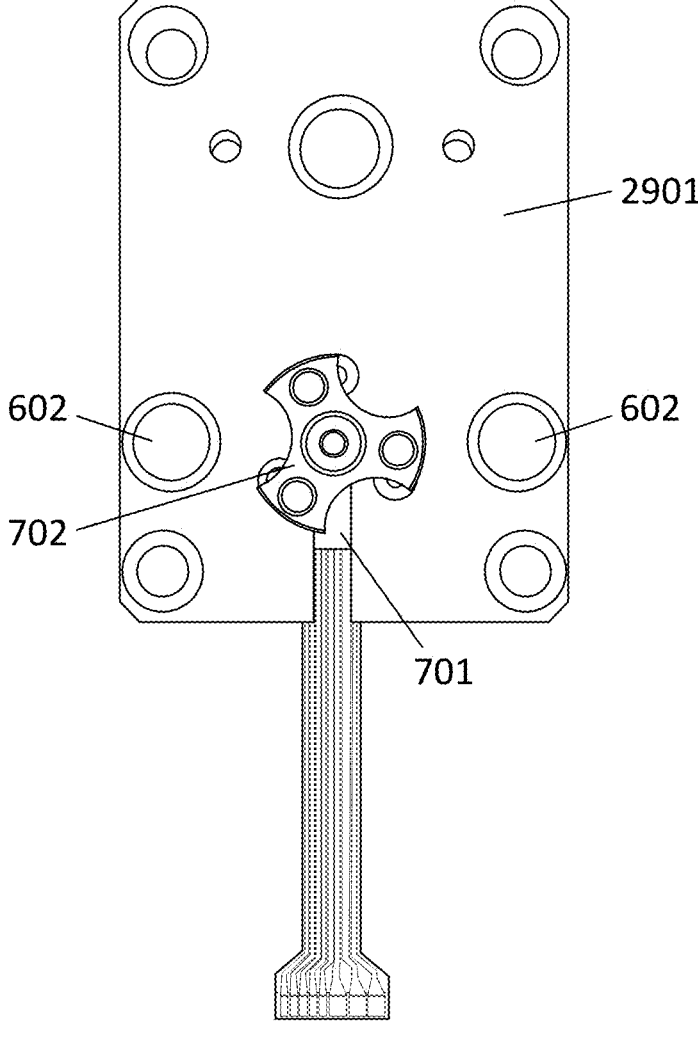
FIG. 30 shows an example drive motor and two magnets attached to a backing plate for use with an optical modulator.

Motor B, which has a much lighter rotor mass and rotational inertia than Motor A, was used with the same chopper wheel. However, in this case, magnetic braking was applied using a pair of permanent magnets to create a strong magnetic field close to the chopper disc. The PID parameters were kept identical to the Motor A implementation. It was observed that the PID controller, as the lower start-up inertia is overcome, drives the motor differently from the Motor A. FIG. 29 (*b*) shows the drive signal to Motor B, where it can be seen that the braking force induced by the magnetic field is still acting within the chart's flat region, hence creating a new control profile with less driving power. FIG. 30 illustrates this implementation with the motor (701) (partially visible, attached from behind the plate) attached to the back plate (2901) (used to position essential features within the housing) and the coupling means (702) for attachment of the disc (not shown). A pair of permanent magnets (602) are shown, which generate the damping force within the aluminium disc.

Figure 31:
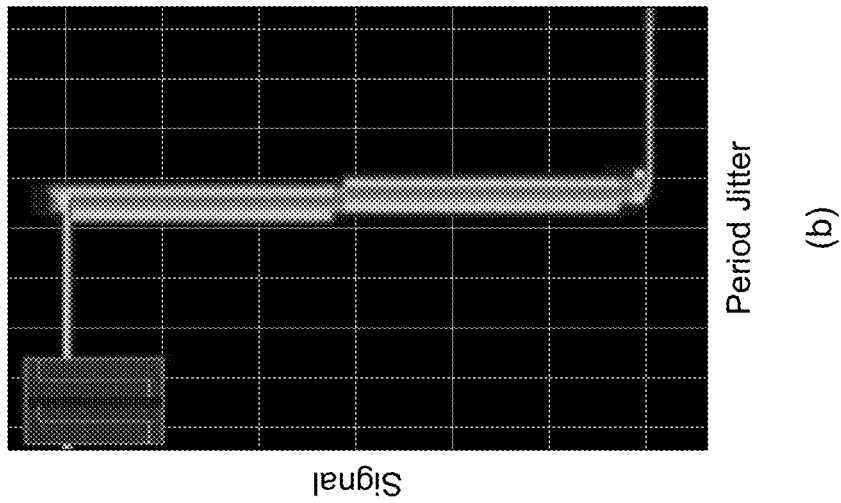
FIGS. 31(a) and 31(b) are oscilloscope traces showing period jitter for the two motors.
Figure 31:
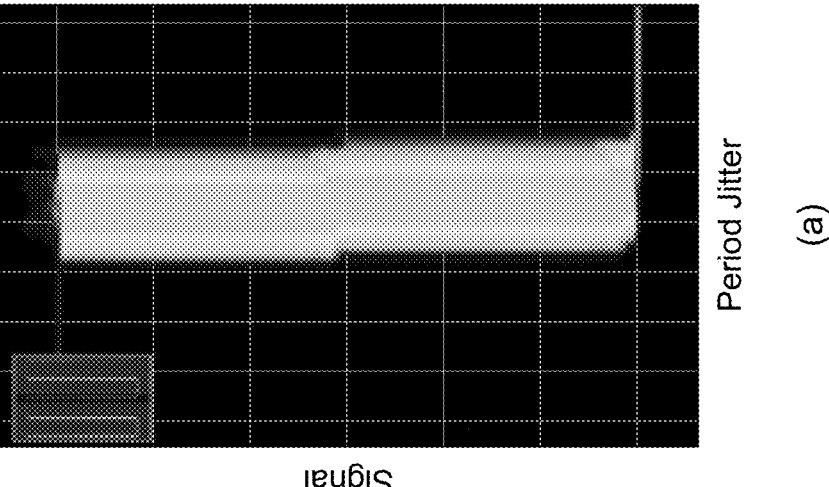

A series of jitter analyses for the rotational periods were performed on the motors and these are illustrated as captured oscilloscope traces in FIG. 31 for many rotations for motors A (a) and B (b). These results have the same vertical and horizontal scale axes and it can be clearly seen that the period jitter for Motor B is significantly reduced in comparison with motor A.

Figure 32:
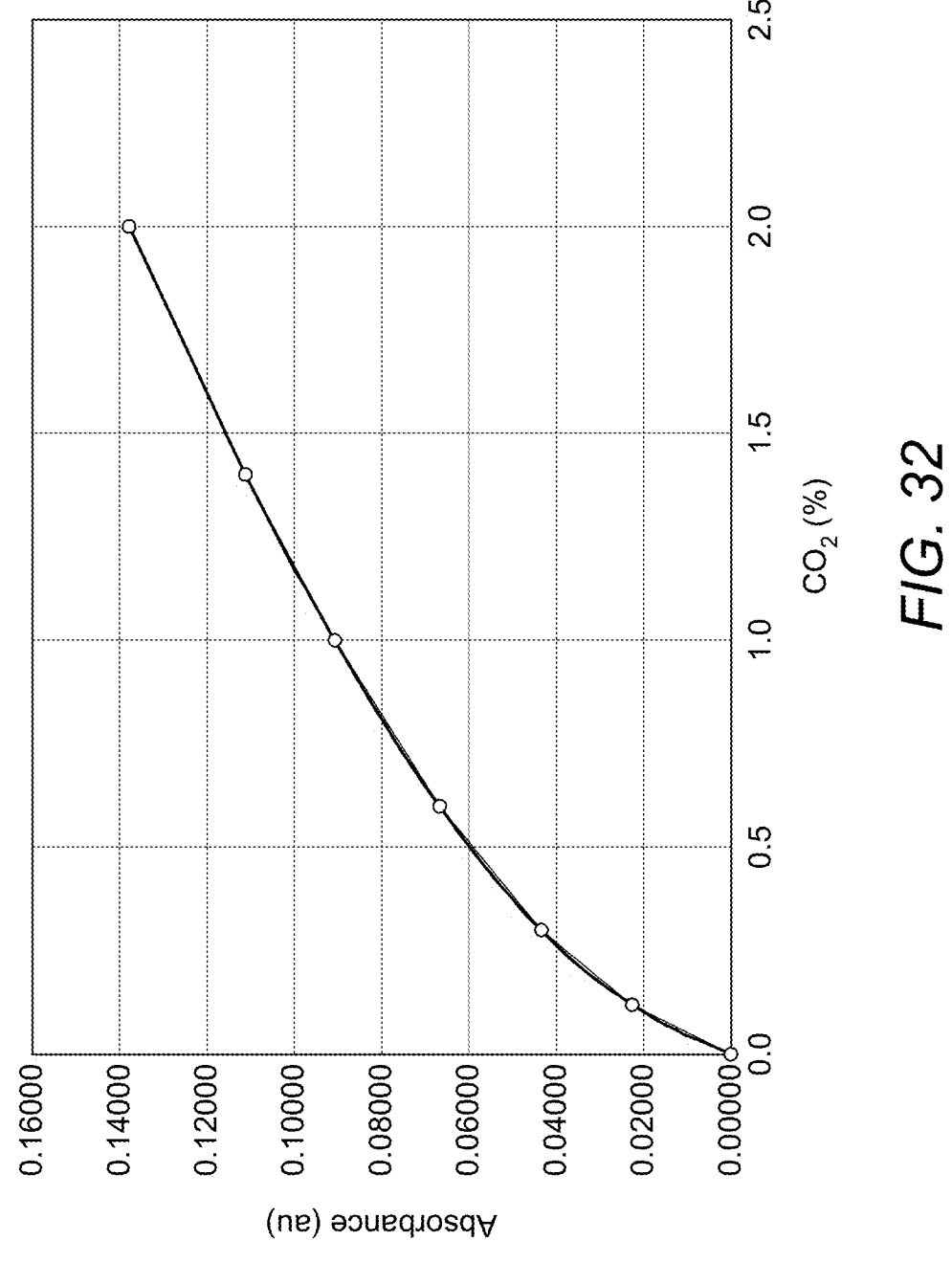
FIG. 32 is a graphical representation of measured absorption and predicted absorption, using light chopped by a rotating optical modulator with magnetic damping.
Figure 33:
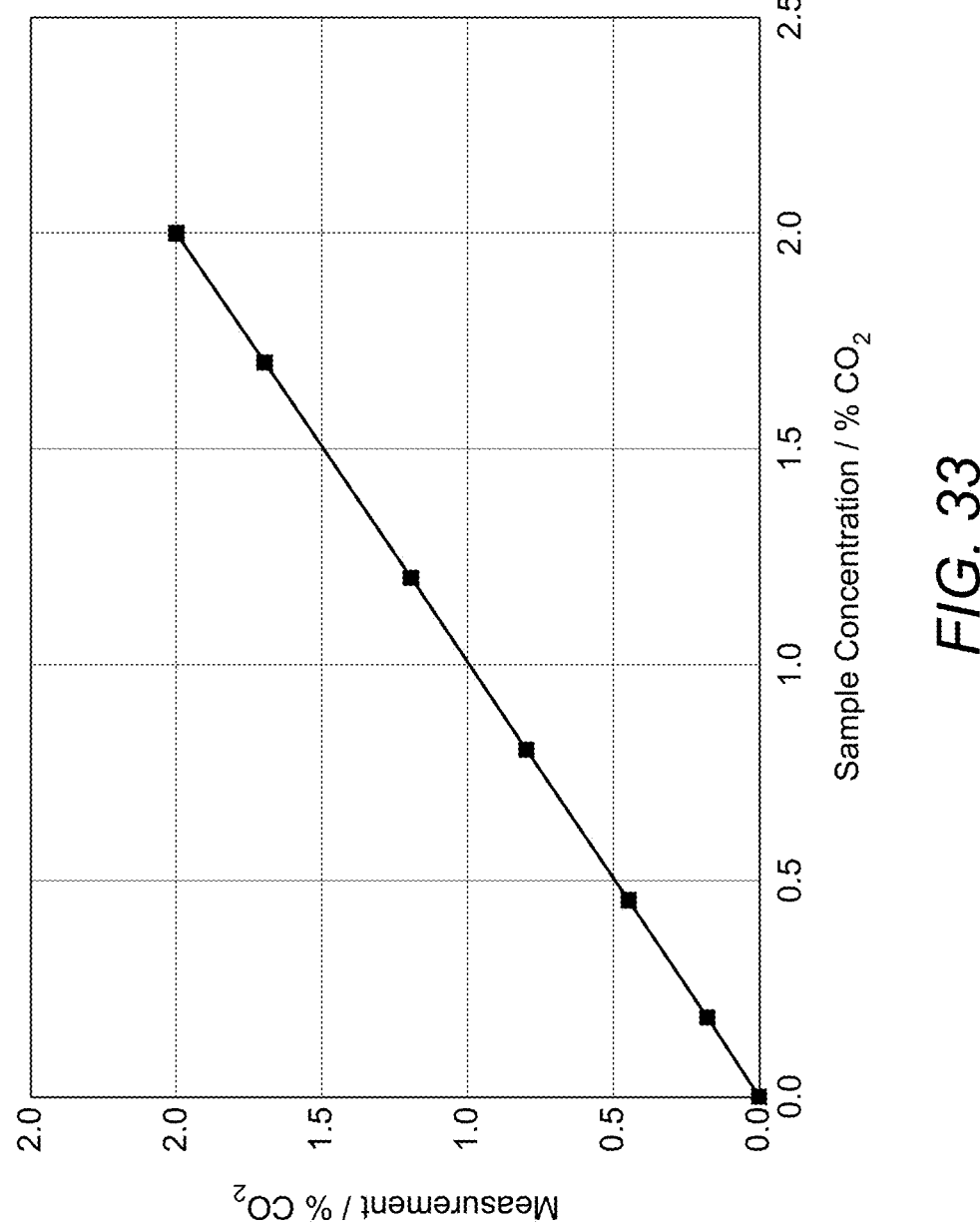
FIG. 33 shows linearised and calibrated results of sample measurement and actual sample concentration, using the same data as FIG. 32.

In order to confirm that the performance of Motor B with magnetic damping was appropriate to use within an infrared spectrometer, motor B was integrated into a gas analyser of similar format to that described in FIG. 24, with the light beam chopped at the source end and where the source used an incandescent element and the detector was a pyroelectric detector. Appropriate filters were mounted in the wheel for the measure and reference measurements. The range chosen for testing was 0 to 2% $CO_2$ in a nitrogen background. FIG. 32 illustrates the extremely close agreement between the theoretically predicted absorption line (solid curve) and the measured results. The analyser was then linearised and calibrated for this range and the results can be seen in FIG. 33, where a highly accurate measurement was obtained.

Example apparatus and methods are set out below in the paragraphs A1 to A33:

A1. An apparatus for use in spectroscopic analysis of a fluid, comprising:

a broad-band light source to emit light in the infrared, visible or ultraviolet wavelength range;

a sample cell to receive the fluid to be measured;

a broadband detector arranged to receive emitted light after transmission through the sample cell, to detect effects of transmission through the sample cell on the transmitted light;

an analyser to analyse the effects of transmission through the sample cell on the transmitted light and to relate these effects to at least one property of a least one measurand in the fluid; and a rotatable optical modulator located in the optical path of the emitted light, the optical modulator having one or more light transmissive optical elements and one or more non-transmissive regions to act as an optical chopper and/or modulator of the emitted light when rotated;

wherein at least one non-contact magnetic field generator is arranged to apply a magnetic field to the optical modulator when rotating, for magnetic damping or braking of rotation of the optical modulator.

A2. An apparatus according to the above paragraph A1, wherein the rotatable optical modulator is a wheel, disc or cylinder and wherein the one or more light transmissive optical elements comprise one or more apertures, windows, lenses, optical pass band filters, or fluid-filled cuvettes.

A3. An apparatus according to any one of the above paragraphs A1 and A2, comprising a drive motor to rotate the optical modulator, and a sensor and control circuitry to provide feedback on the position and/or motion of the optical modulator and to provide feedback control of the magnetic field generator.

A4. An apparatus according to any one of the above paragraphs A1 to A3, wherein the magnetic field generator is arranged to induce electrical currents in electrically conductive material within the rotatable optical modulator, to generate a magnetic damping or braking force during rotation of the rotatable optical modulator.

A5. An apparatus according to any one of the above paragraphs A1 to A4, wherein the rotatable optical modulator comprises a wheel, disc or cylinder composed of a non-ferromagnetic, electrically conductive material or composite.

A6. An apparatus according to paragraph A5 above, where the wheel, disc or cylinder is mechanically balanced around the axis of rotation.

A7. An apparatus according to any one of paragraphs A1 to A6 above, wherein the rotatable optical modulator comprises a wheel, disc or cylinder that has a non-uniform cross-sectional area.

A8. An apparatus according to any of paragraphs A1 to A4 above, wherein the rotatable optical modulator comprises a wheel, disc or cylinder formed of a homogeneous electrically conductive material or comprises a non-electrically conductive material with electrically conductive material attached to it.

A9. An apparatus according to any of paragraphs A1 to A8 above, wherein the rotatable optical modulator is a wheel, disc or cylinder comprising modulations in the shape, profile or cross section of the wheel, disc or cylinder including partial or full cuts through the material to modify the passage of eddy currents.

A10. An apparatus according to any of paragraphs A1 to A9 above, wherein the rotating optical modulator is a wheel, disc or cylinder having radial projections that extend into a fluid surrounding the wheel, disc or cylinder, to cause viscous drag in the surrounding fluid to the rotary motion.

A11. An apparatus according to any of paragraphs A1 to A10 above, wherein the at least one magnetic field generator is a permanent magnet, electromagnet or a combination of both.

A12. An apparatus according to any of paragraphs A1 to A11 above, further comprising means for determining the rotational speed and/or angular position of the rotatable optical modulator.

A13. An apparatus according to paragraph A12 above, wherein the means for determining rotation speed and or angular position comprises at least one of a Hall effect sensor, a rotary encoder and/or an optical means such as a reflective or slotted optical switch.

A14. An apparatus according to any of paragraphs A1 to A13 above, further comprising a heat sink or surface features of the rotatable optical modulator, such as surface blackening or surface roughness of a wheel or disc comprising the rotatable optical modulator, to enhance heat dissipation.

A15. An apparatus according to any of paragraphs A1 to A14 above, wherein the axis of rotation of the rotatable optical modulator is substantially parallel or substantially perpendicular to the incident light.

A16. A method for use in a spectroscopic analysis system, which system has:
  a broad-band light source emitting light in the infrared, visible or ultraviolet range,
  a sample cell configured to receive the fluid to be measured,
  a broadband detector arranged to receive emitted light after transmission through the sample call, to detect changes in the emitted radiation after transmission through the sample cell,
  an analyser to analyse the change in transmitted intensity and relate this change to at least one property of a least one measurand in the fluid, and a rotating optical modulator located in the optical path of the emitted light to act as an optical chopper and/or modulator;
  wherein the optical modulator contains at least some electrically conductive material and the method comprises:
  applying at least one non-contact magnetic field to the rotating optical modulator, to induce electrical currents within the electrically conductive material of the optical modulator which generate a magnetic damping force acting against the rotation of the optical modulator.

A17. A method according to paragraph A16 above, further comprising:
  monitoring the position and/or motion of the optical modulator and generating a feedback control signal to control the applied magnetic field, thereby to control the induced electrical currents that generate a magnetic damping force acting against the rotation of the optical modulator.

A18. A method according to paragraph A16 or A17 above, wherein the rotating optical modulator comprises a single optical element and the analysis provides a modulated single optical pass band measurement of at least one measurand in the fluid in the sample cell.

A19. A method according to paragraph A16 or A17 above, wherein the rotating optical modulator comprises at least at least two optical pass band filters and/or at least two gas filled cuvettes, and the analysis provides a referenced spectroscopic measurement of at least one measurand in the fluid in the sample cell.

A20. A method according to any of paragraphs A16 to A19 above, wherein temperature control of the rotating optical modulator is implemented.

A21. A method according to paragraph A20 above, wherein means for temperature control is provided within a housing of the rotatable optical modulator.

A22. A method according to any of paragraphs A16 to A21 above, where the magnetic field is applied to just one side of the rotating optical modulator.

A23. A method according to any of paragraphs A16 to A21 above, wherein the rotating optical modulator is a wheel, disc or cylinder and the magnetic field from the at least one magnetic field generator is applied through the wheel, disc or cylinder by the use of magnetic poles of opposite polarity.

A24. A method according to any of paragraphs A16 to A23 above, wherein the applied magnetic field is generated by electromagnets tuned or modulated by an applied current.

A25. A method according to any of paragraphs A16 to A23 above, wherein the applied magnetic field is generated by at least one permanent magnet and is tuned by the magnetic field strength of the magnet and distance away from the rotatable optical modulator and/or radial distance from the axis of rotation of the rotatable optical modulator.

A26. A method according to any of paragraphs A16 to A25 above, wherein an electrically driven motor is used to rotate the rotatable optical modulator.

A27. A method according to paragraph A26 above, wherein the electrical motor is a brushless or brushed DC motor, AC motor or stepper motor.

A28. A method according to any of paragraphs A16 to A27 above, wherein a control system is used to control rotation of the rotatable optical modulator at a desired set point speed.

A29. A method according to paragraph A28 above, wherein the speed of rotation is controlled using PID, P, PI, self-calibrating PID, fuzzy logic, genetic algorithms or artificial intelligence (AI) control systems.

A30. A method according to any of paragraphs A16 to A29 above, wherein the spectroscopic analysis is used to monitor a measurand in a liquid or gaseous sample formed by a natural or artificial process.

A31. A method according to paragraph A30 above, including determining the concentration of a gas or liquid species within a mixture.

A32. A method according to paragraph A30 above, wherein the measurand is one or more of a greenhouse gas, pollutant, toxic or explosive species.

A33. A system to improve the noise, stability and response time of a spectroscopic measurement comprising:

a broad-band light source emitting light in the infrared, visible or ultraviolet range, a sample cell designed to receive the fluid to be measured, a broadband detector to detect changes in the transmitted radiation after passage through the sample cell, optical elements for transmission, refraction or reflection of light throughout the measurement system, and a microprocessor to analyse the change in transmitted intensity and relate this change to at least one property of a least one measurand in the fluid, characterised in that a rotating wheel, disc or cylinder in the optical path is employed to act as an optical chopper and/or modulator containing at least one optical element for spectroscopic measurements for determining at least one property of at least one measurand within a fluid where at least one non-contact magnet provides a magnetic field to the rotating wheel, disc or cylinder containing at least some electrically conductive, non-ferromagnetic material, and for which a motor rotates the wheel, disc or cylinder and at least one sensor provides feedback of the position and/or motion of the wheel, disc or cylinder and a controller controls the rotational speed or angular velocity of the wheel, disc or cylinder and where the magnetic braking induced within the conductive material of the wheel, disc or cylinder to the direction of rotation is used to damp or brake the motion of the wheel, disc or cylinder and whereby the control of the feedback controller for the rotational speed or angular velocity of the wheel, disc or cylinder is enhanced compared to the identical system without the presence of the magnetic braking being applied to the wheel, disc or cylinder.

In conclusion, this patent presents a novel method of enhancing the stability of the rotation of a wheel, disc or cylinder for the proposed application and hence improving signal to noise, as well as several other advantages. The method of one example implementation involves using at least one magnetic field to induce eddy currents within a rotating optical modulator such as a driven chopper wheel, disc or cylinder, or within features associated with the wheel, disc or cylinder, to create a braking effect to the rotary motion. The result is to improve the angular speed stability of the rotating component, resulting in improved spectroscopic measurement stability, reliability and response times. This is especially advantageous for monitoring some critical process applications that require a rotatable optical modulator to be driven with low energy.

For the avoidance of doubt, the claims of this patent specification should not be interpreted as limited to the specific examples of apparatus and methods described above. For example, features described in relation to one of the examples may be implemented in combination with features of another example, unless a limitation is explicitly stated. The examples are provided to aid understanding of the invention and persons skilled in the relevant art will recognize that additional implementations are possible within the scope of the invention set out in the claims of this patent specification.

What is claimed is:

1. An apparatus for use in spectroscopic analysis of a fluid, comprising:

a broad-band light source to emit light in the infrared, visible or ultraviolet wavelength range;

a sample cell to receive the fluid to be measured;

a broadband detector arranged to receive emitted light after transmission through the sample cell, to detect effects of transmission through the sample cell on the transmitted light;

an analyser to analyse the effects of transmission through the sample cell on the transmitted light and to relate these effects to at least one property of a least one measurand in the fluid;

a rotatable optical modulator located in the optical path of the emitted light, the optical modulator having one or more light transmissive optical elements and one or more non-transmissive regions to act as an optical chopper and/or modulator of the emitted light when rotated; and an electrically-driven motor to rotate the optical modulator;

wherein at least one non-contact magnetic field generator is arranged to apply a magnetic field to the optical modulator when rotating, for magnetic damping of rotational jitter of the optical modulator, to stabilize its rotation speed.

2. An apparatus according to claim 1, wherein the rotatable optical modulator is a wheel, disc or cylinder and wherein the one or more light transmissive optical elements comprise one or more apertures, windows, lenses, optical pass band filters, or fluid-filled cuvettes.

3. An apparatus according to claim 1, comprising a sensor and control circuitry to monitor the position and/or motion of the optical modulator and to provide feedback control of the magnetic field generator and/or feedback control of the electrically-driven motor.

4. An apparatus according to claim 3, wherein the electrically-driven motor comprises a monodirectional drive, and wherein the control circuitry comprises a controller to provide feedback control of the magnetic field generator to provide magnetic damping of rotation of the optical modulator.

5. An apparatus according to claim 3, wherein the control circuitry comprises a controller for controlling the electrical drive of the electrically-driven motor, for adjusting the motion of the optical modulator towards a set point rotation speed; wherein the at least one non-contact magnetic field generator is arranged to apply a magnetic field to the optical modulator when rotating, to provide magnetic damping of the adjusted motion.

6. An apparatus according to claim 1, wherein the magnetic field generator is arranged to induce electrical currents in electrically conductive material within the rotatable optical modulator, to generate a magnetic damping force during rotation of the rotatable optical modulator.

7. An apparatus according to claim 1, wherein the rotatable optical modulator comprises a wheel, disc or cylinder composed of a non-ferromagnetic, electrically conductive material or composite.

8. An apparatus according to claim 7, wherein the wheel, disc or cylinder is mechanically balanced around the axis of rotation.

9. An apparatus according to claim 1, wherein the rotatable optical modulator comprises a wheel, disc or cylinder that has a non-uniform cross-sectional area.

10. An apparatus according to claim 1, wherein the rotatable optical modulator comprises a wheel, disc or cylinder formed of a homogeneous electrically conductive material or comprises a non-electrically conductive material with electrically conductive material attached to it.

11. An apparatus according to claim 1, wherein the rotatable optical modulator is a wheel, disc or cylinder comprising modulations in the shape, profile or cross section of the wheel, disc or cylinder including partial or full cuts through the material to modify the passage of eddy currents.

12. An apparatus according to claim 1, wherein the rotating optical modulator is a wheel, disc or cylinder having radial projections that extend into a fluid surrounding the wheel, disc or cylinder, to cause viscous drag in the surrounding fluid to the rotary motion.

13. An apparatus according to claim 1, wherein the at least one magnetic field generator is a permanent magnet, electromagnet or a combination of both.

14. An apparatus according to claim 1, further comprising means for determining the rotational speed and/or angular position of the rotatable optical modulator.

15. An apparatus according to claim 14, wherein the means for determining rotation speed and or angular position comprises at least one of a Hall effect sensor, a rotary encoder and/or an optical means.

16. An apparatus according to claim 1, further comprising a heat sink or surface features of the rotatable optical modulator, to enhance heat dissipation.

17. An apparatus according to claim 1, wherein the axis of rotation of the rotatable optical modulator is substantially parallel or substantially perpendicular to the incident light.

18. An apparatus according to claim 1, wherein the electrically-driven motor is a brushless or brushed DC motor, AC motor or stepper motor.

19. An apparatus according to claim 18, wherein the electrically-driven motor is a geared electric motor.

20. An apparatus according to claim 1, wherein the rotatable optical modulator comprises a housing and comprises means for temperature control provided within the housing of the rotatable optical modulator.

21. A method for use in a spectroscopic analysis system, which system has:

a broad-band light source emitting light in the infrared, visible or ultraviolet range, a sample cell configured to receive the fluid to be measured, a broadband detector arranged to receive emitted light after transmission through the sample call, to detect changes in the emitted radiation after transmission through the sample cell, an analyser to analyse the change in transmitted intensity and relate this change to at least one property of a least one measurand in the fluid, a rotating optical modulator located in the optical path of the emitted light to act as an optical chopper and/or modulator, and an electrically-driven motor arranged to rotate the rotatable optical modulator;

wherein the optical modulator contains at least some electrically conductive material and the method comprises:

using the electrically-driven motor to rotate the rotatable optical modulator; and applying at least one non-contact magnetic field to the rotating optical modulator, to induce electrical currents within the electrically conductive material of the optical modulator which generate a magnetic damping force acting against the rotation of the optical modulator, to damp rotational jitter of the optical modulator to stabilize its rotation speed.

22. A method according to claim 21, further comprising:

monitoring the position and/or motion of the optical modulator and generating a feedback control signal to control the applied magnetic field, thereby to control the induced electrical currents that generate a magnetic damping force acting against the rotation of the optical modulator.

23. A method according to claim 21, wherein the rotating optical modulator comprises a single optical element and the analysis provides a modulated single optical pass band measurement of at least one measurand in the fluid in the sample cell.

24. A method according to claim 21, wherein the rotating optical modulator comprises at least at least two optical pass band filters and/or at least two gas filled cuvettes, and the analysis provides a referenced spectroscopic measurement of at least one measurand in the fluid in the sample cell.

25. A method according to claim 21, wherein temperature control of the rotating optical modulator is implemented.

26. A method according to claim 25, wherein means for temperature control is provided within a housing of the rotatable optical modulator.

27. A method according to claim 21, where the magnetic field is applied to just one side of the rotating optical modulator.

28. A method according to claim 21, wherein the rotating optical modulator is a wheel, disc or cylinder and the magnetic field from the at least one magnetic field generator is applied through the wheel, disc or cylinder by the use of magnetic poles of opposite polarity.

29. A method according to claim 21, wherein the applied magnetic field is generated by electromagnets tuned or modulated by an applied current.

30. A method according to claim 21, wherein the applied magnetic field is generated by at least one permanent magnet and is tuned by the magnetic field strength of the magnet and distance away from the rotatable optical modulator and/or radial distance from the axis of rotation of the rotatable optical modulator.

31. A method according to claim 21, wherein a control system is used to control rotation of the rotatable optical modulator at a desired set point speed.

32. A method according to claim 31, wherein the speed of rotation is controlled using PID, P, PI, self-calibrating PID, fuzzy logic, genetic algorithms or artificial intelligence (AI) control systems.

33. A method according to claim 21, wherein the spectroscopic analysis is used to monitor a measurand in a liquid or gaseous sample formed by a natural or artificial process.

34. A method according to claim 33, including determining the concentration of a gas or liquid species within a mixture.

35. A method according to claim 33, wherein the measurand is one or more of a greenhouse gas, pollutant, toxic or explosive species.

36. A system to improve the noise, stability and response time of a spectroscopic measurement comprising:

a broad-band light source emitting light in the infrared, visible or ultraviolet range, a sample cell designed to receive the fluid to be measured, a broadband detector to detect changes in the transmitted radiation after passage through the sample cell, optical elements for transmission, refraction or reflection of light throughout the measurement system, and a microprocessor to analyse the change in transmitted intensity and relate this change to at least one property of a least one measurand in the fluid, characterised in that a rotating wheel, disc or cylinder in the optical path is employed to act as an optical chopper and/or modulator containing at least one optical element for spectroscopic measurements for determining at least one property of at least one measurand within a fluid, and at least one non-contact magnet provides a magnetic field to the rotating wheel, disc or cylinder containing at least some electrically conductive, non-ferromagnetic material, and an electrically-driven motor rotates the wheel, disc or cylinder and at least one sensor provides feedback of the position and/or motion of the wheel, disc or cylinder, and a controller controls the rotational speed or angular velocity of the wheel, disc or cylinder; and wherein the at least one non-contact magnet induces magnetic braking within the conductive material of the wheel, disc or cylinder to damp rotational jitter of the wheel, disc or cylinder, to stabilize the rotation speed of the wheel, disc or cylinder;

whereby the control of the feedback controller for the rotational speed or angular velocity of the wheel, disc or cylinder is enhanced compared to an equivalent motor-driven wheel, disc or cylinder without magnetic braking.

* * * * *